(12) United States Patent
Yabuta et al.

(10) Patent No.: US 8,184,145 B2
(45) Date of Patent: *May 22, 2012

(54) DISPLAY DEVICE AND ELECTRONIC APPARATUS

(75) Inventors: Koji Yabuta, Kashiba (JP); Hiroshi Fukushima, Yamatokoriyama (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1383 days.

This patent is subject to a terminal disclaimer.

(21) Appl. No.: 11/576,555

(22) PCT Filed: Oct. 3, 2005

(86) PCT No.: PCT/JP2005/018262
§ 371 (c)(1),
(2), (4) Date: Apr. 3, 2007

(87) PCT Pub. No.: WO2006/038574
PCT Pub. Date: Apr. 13, 2006

(65) Prior Publication Data
US 2008/0084471 A1    Apr. 10, 2008

(30) Foreign Application Priority Data
Oct. 4, 2004  (JP) .................................. 2004-291865

(51) Int. Cl.
H04N 13/00    (2006.01)
(52) U.S. Cl. .............................. 348/42; 345/87; 349/142
(58) Field of Classification Search .................... 348/42; 345/173, 174, 87; 349/142
See application file for complete search history.

(56) References Cited

U.S. PATENT DOCUMENTS

| | | | |
|---|---|---|---|
| 4,198,539 A | 4/1980 | Pepper, Jr. |
| 4,293,734 A | 10/1981 | Pepper, Jr. |
| 4,302,011 A | 11/1981 | Pepper, Jr. |
| 4,353,552 A | 10/1982 | Pepper, Jr. |
| 4,371,746 A | 2/1983 | Pepper, Jr. |
| 4,430,917 A | 2/1984 | Pepper, Jr. |

(Continued)

FOREIGN PATENT DOCUMENTS

JP    56-500230 A    2/1981
(Continued)

OTHER PUBLICATIONS

Official Communication issued in corresponding U.S. Appl. No. 11/574,609, mailed on Dec. 8, 2009.

(Continued)

Primary Examiner — Yves Dalencourt
(74) Attorney, Agent, or Firm — Keating & Bennett, LLP

(57) ABSTRACT

In a SW-LCD, an orienting film is divided into first and second regions having different directions of orientation, and a transparent electrode film is also patterned so as to be divided into regions respectively corresponding to the first and second regions. In the first region, a viewing angle in right and left directions is controlled. In the second region, a viewing angle in upper and lower directions is controlled. With this, a display device is realized which makes it possible to switch between a wide viewing angle display mode and a narrow viewing angle display mode, which controls a viewing angle in both upper and lower directions and in right and left directions in the narrow viewing angle display mode, and which makes it possible to prevent an image from being seen obliquely from the right and left directions and from the upper and lower directions.

4 Claims, 13 Drawing Sheets

U.S. PATENT DOCUMENTS

| | | | |
|---|---|---|---|
| 4,626,851 A | 12/1986 | Tooze | |
| 4,953,949 A | 9/1990 | Dallas | |
| 5,513,334 A | 4/1996 | Alexander | |
| 5,519,533 A | 5/1996 | Nomura et al. | |
| 5,638,082 A | 6/1997 | Grimm | |
| 5,642,214 A | 6/1997 | Ishii et al. | |
| 5,787,152 A | 7/1998 | Freadman | |
| 5,831,698 A | 11/1998 | Depp et al. | |
| 5,899,551 A | 5/1999 | Neijzen et al. | |
| 5,936,596 A | 8/1999 | Yoshida et al. | |
| 5,945,965 A | 8/1999 | Inoguchi et al. | |
| 6,205,554 B1 | 3/2001 | Sasaki et al. | |
| 6,445,434 B2 * | 9/2002 | Takato et al. | 349/123 |
| 6,987,550 B2 | 1/2006 | Takato et al. | |
| 6,989,880 B2 | 1/2006 | Takato et al. | |
| 7,330,178 B2 | 2/2008 | Yorio et al. | |
| 7,486,350 B2 | 2/2009 | Yabuta et al. | |
| 2001/0015782 A1 | 8/2001 | Takato et al. | |
| 2001/0026330 A1 | 10/2001 | Oh | |
| 2003/0007227 A1 | 1/2003 | Ogino | |
| 2003/0146893 A1 | 8/2003 | Sawabe | |
| 2003/0147112 A1 | 8/2003 | Mukawa | |
| 2003/0195421 A1 | 10/2003 | Demers et al. | |
| 2004/0033812 A1 | 2/2004 | Matsunaga et al. | |
| 2004/0085353 A1 | 5/2004 | Kawakami et al. | |
| 2004/0100598 A1 | 5/2004 | Adachi et al. | |
| 2004/0185920 A1 | 9/2004 | Choi et al. | |
| 2004/0207594 A1 | 10/2004 | Kubo | |
| 2004/0217945 A1 | 11/2004 | Miyamoto et al. | |
| 2004/0252258 A1 * | 12/2004 | Matsushima | 349/96 |
| 2004/0252679 A1 | 12/2004 | Williams et al. | |
| 2005/0020325 A1 | 1/2005 | Enger et al. | |
| 2005/0143124 A1 | 6/2005 | Kennedy et al. | |
| 2005/0215291 A1 | 9/2005 | McDonald | |
| 2005/0243265 A1 | 11/2005 | Winlow et al. | |
| 2005/0286000 A1 | 12/2005 | Tsai et al. | |
| 2006/0066794 A1 | 3/2006 | Hotta et al. | |

FOREIGN PATENT DOCUMENTS

| | | |
|---|---|---|
| JP | 06-110403 A | 4/1994 |
| JP | 08-114795 A | 5/1996 |
| JP | 08-136909 A | 5/1996 |
| JP | 09-105958 A | 4/1997 |
| JP | 10-153968 A | 6/1998 |
| JP | 10-240186 A | 9/1998 |
| JP | 10-319373 A | 12/1998 |
| JP | 11-007045 A | 1/1999 |
| JP | 11-174489 A | 7/1999 |
| JP | 2001-264768 A | 9/2001 |
| JP | 2001-318374 A | 11/2001 |
| JP | 2001-344050 A | 12/2001 |
| JP | 2003-015535 A | 1/2003 |
| JP | 2003-066417 A | 3/2003 |
| JP | 2003-099192 A | 4/2003 |
| JP | 2003-298715 A | 10/2003 |
| JP | 2004-038035 A | 2/2004 |
| JP | 2004-062094 A | 2/2004 |
| JP | 2004-133334 A | 4/2004 |
| JP | 2004-233527 A | 8/2004 |
| JP | 2004-279793 A | 10/2004 |
| JP | 2005-181588 A | 7/2005 |
| JP | 2005-260858 A | 9/2005 |
| JP | 2005-292586 A | 10/2005 |
| JP | 2005-316470 A | 11/2005 |
| JP | 2005-345799 A | 12/2005 |
| JP | 2006-003754 A | 1/2006 |
| JP | 2006-011451 A | 1/2006 |
| JP | 2006-064882 A | 3/2006 |
| JP | 2006-098784 A | 4/2006 |
| KR | 2000-0039870 A | 7/2000 |
| KR | 2003-0040345 A | 5/2003 |
| WO | 80/01762 A1 | 9/1980 |

OTHER PUBLICATIONS

Official Communication issued in corresponding U.S. Appl. No. 11/574,371, mailed on Jan. 12, 2010.
Official Communication issued in corresponding U.S. Appl. No. 11/574,375, mailed on Jan. 12, 2010.
Official Communication for PCT Application No. PCT/JP2005/016590; mailed on Oct. 18, 2005.
Official Communication for PCT Application No. PCT/JP2005/015680; mailed on Oct. 25, 2005.
Official Communication for PCT Application No. PCT/JP2005/015661; mailed on Oct. 25, 2005.
Akira Imai et al.; "Display Control Device, Display Apparatus, Method of Controlling Display Device, Display Control Program, and Storage Medium Storing the Program"; U.S. Appl. No. 11/574,371, filed Feb. 27, 2007.
Akira Imai et al.; "Viewing-Angle Control Device, Display Apparatus, Method for Controlling Viewing-Angle Control Device, Viewing-Angle Control Program, and Storage Medium Storing the Program"; U.S. Appl. No. 11/574,375, filed Feb. 27, 2007.
Tomoo Takatani et al.; "Display Device, Viewing Angle Control Device, and Electronic Apparatus"; U.S. Appl. No. 11/574,609, filed Mar. 2, 2007.
Official Communication for PCT Application No. PCT/JP2005/016003; mailed on Oct. 11, 2005.
Official Communication for PCT Application No. PCT/JP2005/016773; mailed on Oct. 25, 2005.
Hiroshi Fukushima et al.; "Display Device, Viewing Angle Control Device, and Electronic Apparatus"; U.S. Appl. No. 11/575,112, filed Mar. 12, 2007.
Koji Yabuta et al.; "Display Device, Viewing Angle Control Device, and Electronic Device"; U.S. Appl. No. 11/575,244, filed Mar. 14, 2007.
Official Communication for PCT Application No. PCT/JP2005/018262; mailed on Nov. 15, 2005.
Yabuta et al., "Display Device, Viewing Angle Conrol Device, Electronic Display Device, and Multiple Image Display Device," U.S. Appl. No. 11/315,128, filed Dec. 23, 2005.

* cited by examiner

DISPLAY DEVICE AND ELECTRONIC APPARATUS

BACKGROUND OF THE INVENTION

1. Field of the Invention

The present invention relates to a display device. Particularly, the present invention relates to a display device which makes it possible to switch to a mode in which an image to be seen is changed in accordance with a viewing direction.

2. Description of the Related Art

In recent years, electronic apparatuses have become lighter and lighter, so that an electronic apparatus, such as a portable phone or a mobile personal computer, which has a display can be taken out to and used in a public place. This has caused such a problem that a confidential document or information that a user wishes to individually browse is seen by a person near the user.

In response to this problem, there has been proposed a display device which can be set in a wide viewing angle display mode under normal conditions and which can be switched to a narrow viewing angle display mode when taken out to and used in a public place. The narrow viewing angle display mode refers to a mode in which a user right in front of a display can see a normal display image and in which a plain image or another image is seen from an oblique direction. Further, by making it possible to switch to the wide viewing angle display mode, it is possible to deal with a situation where a wide viewing angle is required, e.g., where a shot image needs to be seen by a large number of people.

Examples of a part for carrying out such a display include a viewing angle variable element disclosed in Japanese Unexamined Patent Application No. 105958/1997 (Tokukaihei 9-105958 (Patent Document 1); published on Apr. 22, 1997). According to the viewing angle variable element, a narrow viewing angle is obtained when liquid crystal molecules of a liquid-crystal layer provided between a pair of substrates are oriented in a direction perpendicular to the substrates, and a wide viewing angle is obtained when the liquid crystal molecules are oriented in a direction parallel to the substrates. Further, Japanese Unexamined Patent Application No. 62094/2004 (Tokukai 2004-62094 (Patent Document 2); published on Feb. 26, 2004) describes viewing angle changing means for changing a viewing angle of information means by changing the orientation of liquid crystals provided between two glass plates.

Furthermore, there is a display device arranged so as to be divided into several zones, for, example, in which liquid crystals are oriented in different directions. With this arrangement, in cases where a display is seen from a direction other than the front direction in a narrow viewing angle display mode, an image different from an image shown by the display can be seen. For example, Japanese Unexamined Patent Application No. 264768/2001 (Tokukai 2001-264768 (Patent Document 3); published on Sep. 26, 2001) discloses a liquid crystal display device in which orienting films sandwiching liquid crystals therebetween are divided into a plurality of regions and in which the regions adjacent to one another have different directions of orientation. Further, Japanese Unexamined Patent Application No. 38035/2004 (Tokukai 2004-38035 (Patent Document 4); published on Feb. 5, 2004) discloses a liquid crystal display device in which first and second liquid crystal cells having different viewing directions are alternately provided.

However, a recent portable phone has a display section which is vertically positioned so as to be normally observed and which is horizontally positioned so as to display a television image or the like. This caters to the increasing number of scenes where the user chooses by himself/herself where the display section faces.

On the other hand, in either of Patent Documents 1 and 4, viewing angle control carried out in a narrow viewing angle display mode can only prevent an image from being seen obliquely from one direction (horizontal direction). That is, the image can be prevented from being seen obliquely from right and left directions, but cannot be prevented from being seen obliquely from upper and lower directions.

Thus, according to the conventional techniques, the viewing angle control can only prevent an image from being seen from right and left directions. Therefore, in cases where the display section is observed in its normal vertical position, the user's privacy is protected by controlling a viewing angle. However, in cases where the display section is observed in its horizontal position, the viewing angle control prevents the image from being seen from upper and lower directions, so that the user's privacy cannot be protected from anyone who is on either side of the user.

Further, see a case where a user standing in a train uses a mail function of a mobile phone. In this case, even when the display section is used in its vertical position, a person standing behind the user may be able to glance over the user's shoulder at the display. In order to prevent an image from being seen from a backward direction in such a case, it is important to prevent the image from being seen obliquely from upper and lower directions. For this reason, the narrow viewing angle display mode is required to prevent an image from being seen obliquely from upper and lower directions as well as right and left directions.

SUMMARY OF THE INVENTION

It is an object of the present invention to realize a display device which makes it possible to switch between a wide viewing angle display mode and a narrow viewing angle display mode, which controls a viewing angle both in upper and lower directions and in right and left directions in the narrow viewing angle display mode, and which makes it possible to prevent an image from being seen obliquely from the right and left directions and from the upper and lower directions.

In order to attain the foregoing object, a display device according to the present invention is a display device, including: image display means for displaying an image; and display switching means for electrically switching between (i) an image to be seen in a single image display mode and (ii) an image to be seen in a multiple image display mode, in the single image display mode, the display switching means allowing an image displayed by the image display means to be seen from any direction, in the multiple image display mode, the display switching means (a) allowing an image displayed by the image display means to be seen from a front direction and (b) allowing an image obtained by superimposing, on an image displayed by the image display means, a pattern image formed by the display switching means to be seen from an oblique direction, and the display switching means being divided into a first region and a second region, in the single image display mode, the display switching means allowing an image, displayed by the image display means, to be seen from any direction in both of the first and second regions, in the multiple image display mode, the display switching means either (I) allowing an image to be seen from right and left directions, which image is obtained by superimposing, on an image displayed by the image display means, an pattern image causing the first region to be a non-transmission region, or (II) allowing an image to be seen from upper and lower directions, which image is obtained by superimposing, on an image displayed by the image display means, a pattern image causing the second region to be a non-transmission region.

According to the foregoing arrangement, a pattern image formed by the display switching means is superimposed on an image displayed by the image display means, so that the image displayed by the mage display means is prevented from being seen from an oblique direction.

Furthermore, the display switching means is divided into (i) a first region that prevents an image from being seen obliquely from right and left directions and (ii) a second region that prevents an image from being seen obliquely from upper and lower directions. This makes it possible to realize a display device which makes it possible to prevent an image from being seen obliquely from the right and left directions and from the upper and lower directions.

BRIEF DESCRIPTION OF THE DRAWINGS

FIG. 3(a) is a diagram showing a display surface of the display section as the viewer faces. FIG. 3(b) is a cross-sectional view taken along the line A-A'. FIG. 3(c) is a cross-sectional view taken along the line B-B'.

FIG. 4(a) is a cross-sectional view taken along the line A-A'. FIG. 4(b) is a cross-sectional view taken along the line B-B'.

FIG. 5(a) is a cross-sectional view taken along the line A-A'. FIG. 5(b) is a cross-sectional view taken along the line B-B'.

FIG. 6(a) is a diagram showing a display surface of the display section as the viewer faces. FIG. 6(b) is a cross-sectional view taken along the line A-A'. FIG. 6(c) is a cross-sectional view taken along the line B-B'.

FIG. 7(a) is a cross-sectional view taken along the line A-A'. FIG. 7(b) is a cross-sectional view taken along the line B-B'.

FIG. 8(a) is a cross-sectional view taken along the line A-A'. FIG. 8(b) is a cross-sectional view taken along the line B-B'.

DETAILED DESCRIPTION OF PREFERRED EMBODIMENTS

An embodiment of the present invention will be described below with reference to the drawings.

Figure 2:
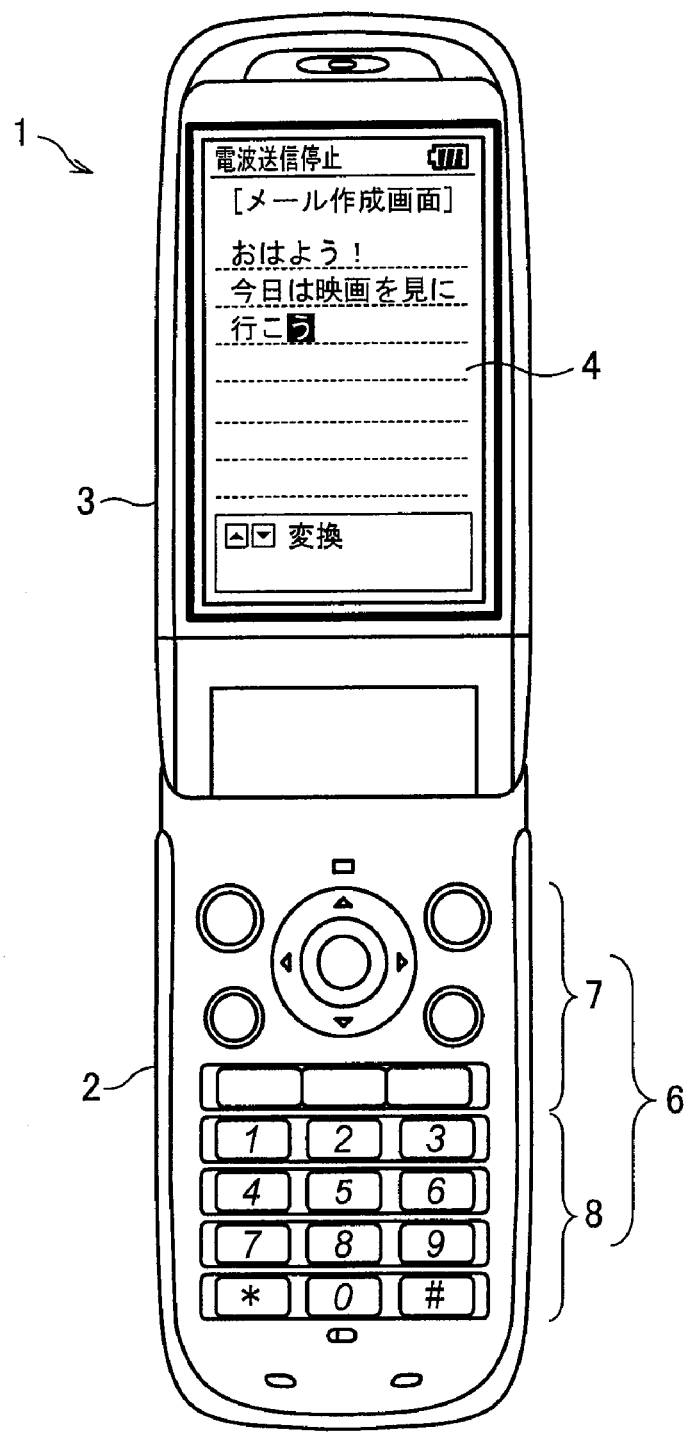
FIG. 2 is a diagram showing the portable phone according to the embodiment of the present invention.

FIG. 2 shows an appearance of a portable phone (electronic apparatus) 1 according to an embodiment of the present invention. The portable phone 1 of the present embodiment is a so-called clamshell type, and FIG. 2 shows the portable phone 1 that is opened. FIG. 2 shows a portion that becomes an inner side when the portable phone 1 is closed, and this portion is a side mainly used by the user when the portable phone 1 is opened. Accordingly, the present invention assumes that the side shown in FIG. 2 is a front side.

As shown in FIG. 2, the portable phone 1 includes a main body 2 and a lid body 3, and the main body 2 and the lid body 3 are connected to each other in a hinge manner. The lid body 3 has its front side provided with a display section (display device) 4.

The main body 2 has its front side provided with a main operation button group 6. The main operation button group 6 includes a function button group 7 for carrying various setting and function switching in the portable phone 1 and an input button group 8 for inputting symbols such as numbers and characters. Specifically, the function button group 7 includes a power button for switching on and off the portable phone, a camera button for launching a camera mode, a mail button for launching a mail mode, a cross button for moving a target of selection up and down and from side to side, a decision button, provided in the center of the cross button, for deciding on various selections, and other buttons. Further, the input button group 8 is a numeric pad.

According to the portable phone 1 of the present invention, while the display section 4 shows the user a main image such as a message body or a shot image, the display section 4 shows another image to people around the user. Hereinafter, the mode in which the message body or the shot image becomes unable to be seen from the people around the user is referred to as "narrow viewing angle mode (multiple image display mode)", and a normal mode in which a display carried out by the display section 4 can be seen from any angle is referred to as "wide viewing angle mode (single image display mode)". The user can arbitrarily switch between the narrow viewing angle mode and the wide viewing angle mode by using an operation button.

In the wide viewing angle mode, the main image is seen regardless of whether the display section 4 is seen directly from the front (front direction) or from an oblique direction. On the other hand, in the narrow viewing angle mode, although the main image is seen from the front direction, an image obtained by superimposing, on the main image, a pattern image formed so as to obscure the main image is seen from an oblique direction.

The following explains a detailed arrangement of the display section 4.

Figure 1:
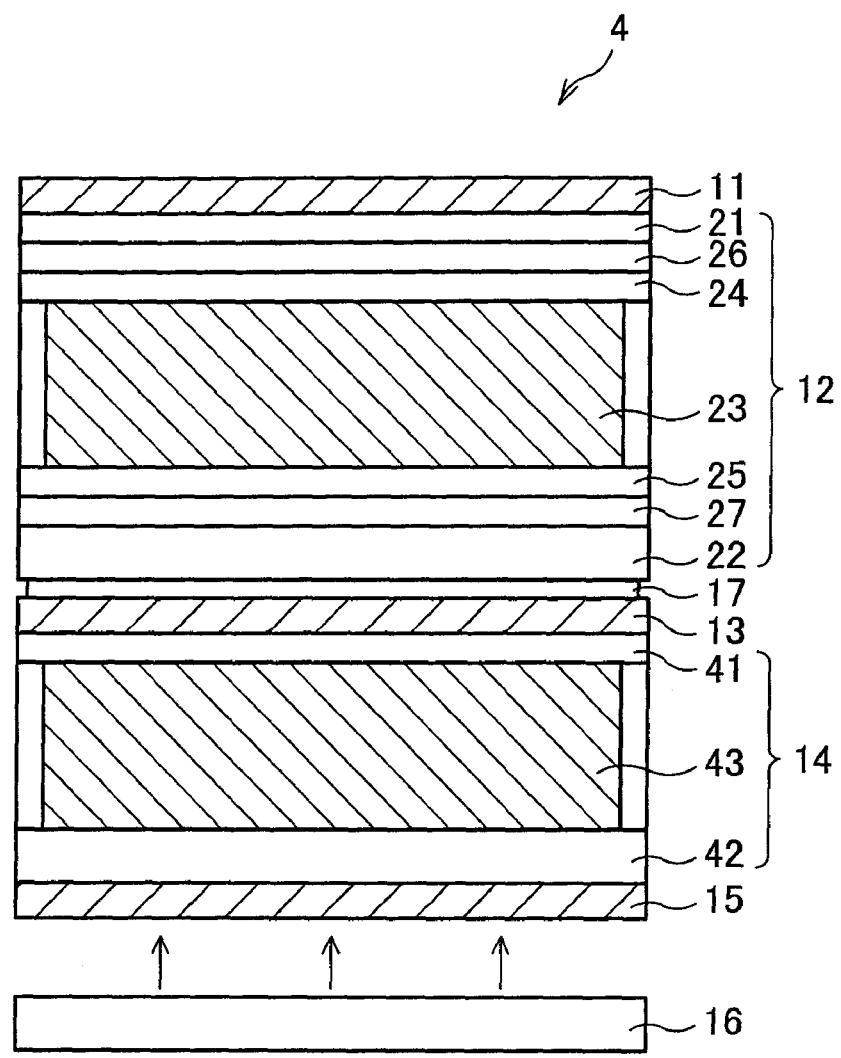
FIG. 1 is a cross-sectional view of a display section of a portable phone according to an embodiment of the present invention.

FIG. 1 is a cross-sectional view of the display section 4. The display section 4 includes a second polarization plate (second polarizing means, linear polarization plate) 11, a switching liquid crystal display section (display switching means, liquid crystal element; hereinafter referred to as "SW-LCD") 12, a first polarization plate (first polarizing means) 13, a main liquid crystal display section (image display means; hereinafter referred to as "main LCD") 14, and a third polarization plate 15 that are laminated in this order, and includes a backlight 16 provided on a side of the third polarization plate 15.

Here, it is preferable that the first polarization plate 13 be set to have a polarization transmission axis parallel to that of the second polarization plate 11. However, the first polarization plate 13 possibly has any axial angle in accordance with the characteristics required of the main LCD.

In this case, the direction of polarization of linear polarized light emitted from the first polarization plate 13 set to have a given axial angle is rotated appropriately with the use of a λ/2 plate or the like so as to corresponds to the transmission axis of the second polarization plate 11. This makes it possible to obtain the same effects as those obtained when the polarization transmission axis of the first polarization plate 13 is set to be parallel to that of the second polarization plate 11.

The second polarization plate 11 is pasted to the SW-LCD 12. The first polarization plate 13 and the third polarization plate 15 are pasted to both surfaces of the main LCD 14, respectively. A side of the SW-LCD 12 to which side the second polarization plate 11 is not pasted and the main LCD are joined to each other via the first polarization plate 13 with an adhesive section 17. Moreover, the SW-LCD 12 to which the second polarization plate 11 has been pasted functions as a viewing angle control device. Further, the adhesive section 17 may be joined with a heat- or ultraviolet-curable resin adhesive or may be fixed with a so-called double-sided tape. Further, all or part (e.g., a frame portion) of the adhesive section 17 may be a pasting region.

In the main LCD 14, a pair of transparent electrode substrates 41 and 42 sandwiches a liquid crystal layer 43 therebetween. The orientation of liquid crystal molecules of the liquid crystal layer 43 is changed by applying a voltage to the transparent electrode substrates 41 and 42 in accordance with a control section (not shown). With this, an image is displayed. The main LCD 14 is controlled by the control section (not shown) so as to display an image such as an operation screen of the portable phone 1, a picture, or a message body. Examples of the main LCD 14 include a commonly-known liquid crystal display device. For example, it is possible to use a liquid crystal display device of any mode, such as a TN (twisted-nematic) mode liquid crystal display device and a VA (vertical-alignment) mode liquid crystal display device each of which is driven using an active-matrix driving method. Further, instead of the main liquid crystal display section 14, a self-luminous display such as an organic EL (electroluminescence) display device or a plasma display device may be used. No backlight is needed in cases where the self-luminous display is used.

The SW-LCD 12 includes a substrate 21, a transparent electrode film 26, an orienting film 24, a liquid crystal layer 23, an orienting film 25, a transparent electrode film 27, and a substrate 22 that are formed in this order. The direction of initial orientation of liquid crystal molecules of the liquid crystal layer 23 is determined in accordance with the orienting films 25 and 27, and the direction of orientation is changed in accordance with a voltage applied to the transparent electrodes 26 and 27 by the control section (not shown). Moreover, the narrow viewing angle mode and the wide viewing angle mode are switched back and forth in accordance with the change in direction of orientation.

The liquid crystal layer 23 is provided between the substrates 21 and 22. The orientation of the liquid crystal molecules of the liquid crystal layer 23 is changed by applying a voltage to the transparent electrode films 26 and 27 in accordance with the control section (not shown). With this, an image is displayed. The control section changes the direction of orientation of the liquid crystal molecules of the liquid crystal layer 23 for the wide viewing angle mode or for the narrow viewing angle mode in accordance with whether the user has set the wide viewing angle mode or the narrow viewing angle mode. Note that it is possible that only either of the orienting films 24 and 25 is provided.

The backlight 16 supplies light for use in a display. The third polarization plate 15 extracts linear polarized light having a fixed polarization direction from light having been emitted from the backlight 16 and having not been incident on the main LCD 14. The first polarization plate 13 extracts linear polarized light having a fixed polarization direction from light having passed through the main LCD 14 and having not been incident on the SW-LCD 12. The second polarization plate 11 extracts linear polarized light having a fixed polarization direction from backlight having passed through the main LCD 14 and the SW-LCD 12.

The following explains a relationship between viewing angle control and a change in orientation of the liquid crystal molecules of the SW-LCD with reference to FIGS. 3 through 10. Specifically, the following explains four examples of the orientation of the liquid crystal molecules of the SW-LCD. Examples explained in the following examples of the orientation of the liquid crystal molecules do not show a display state of the entire display surface of the display section 4, but basically shows a display state of part of the display surface.

Example 1 of the Orientation of the Liquid Crystal Molecules of the SW-LCD

Figure 3:
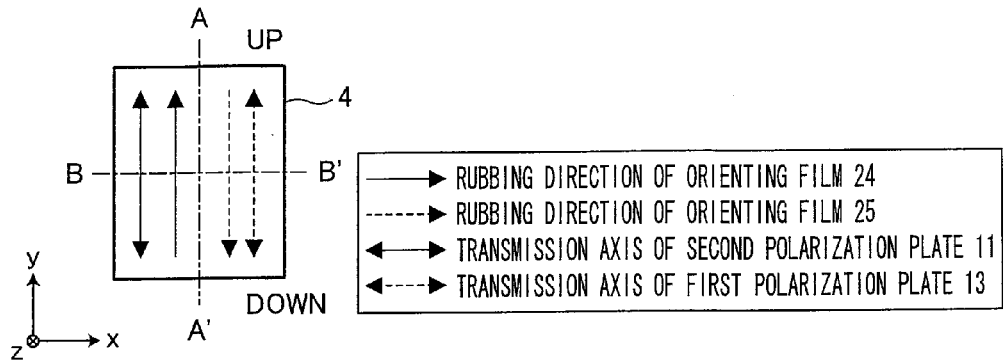
FIGS. 3(a) to 3(c) show the display section of the portable phone, according to the embodiment of the present invention, set in a mode in which viewing from an oblique direction is not prevented.
Figure 3:
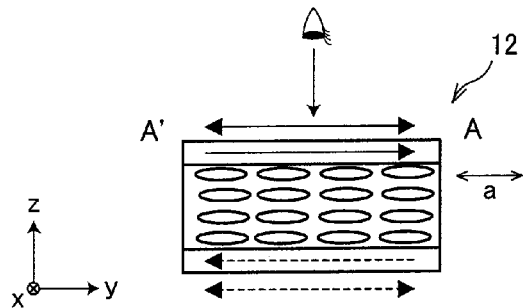
Figure 3:
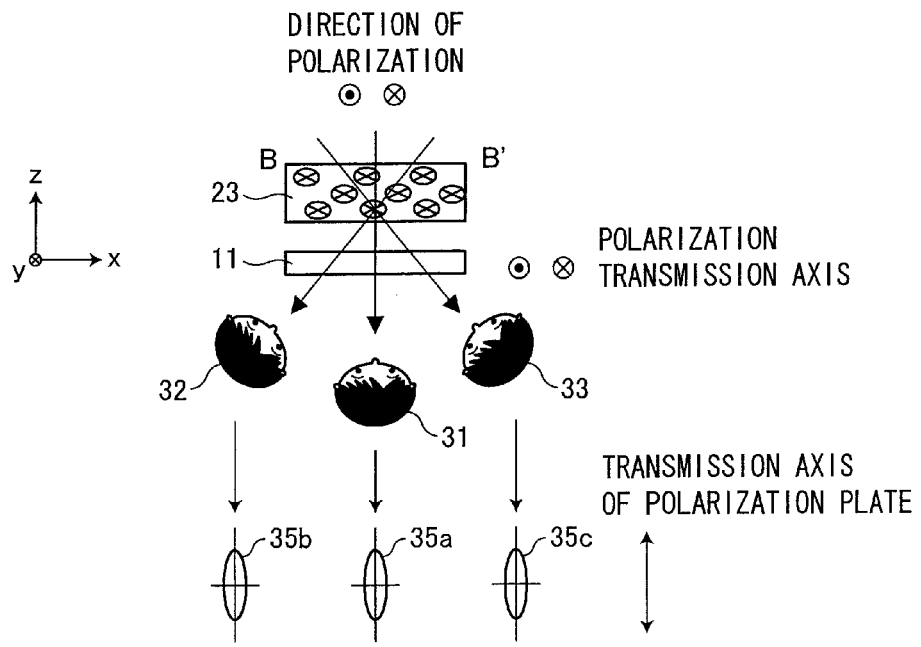

FIG. 3(a) shows a display surface of the display section 4 of the portable phone 1 so that the upper and lower sides of an image displayed by the main LCD 14 respectively correspond to the upper and lower sides of the page. Hereinafter, the right-and-left and up-and-down directions on the display screen are respectively referred to as "x direction" and "y direction", and the direction of thickness of the display section 4 is referred to as "z direction". Further, in FIGS. 3 through 8, the transparent electrode films 26 and 27 and the orienting films 24 and 25 are omitted.

First, as shown in FIG. 3(a), the second polarization plate 11 and the first polarization plate 13 are provided so as to have respective polarization transmission axes extending in the y direction. Further, the respective rubbing directions of the orienting films 24 and 25 are set to be parallel to the respective polarization transmission axes of the first and second polarization plates 13 and 11 so as to be reversed 180° with respect to each other. That is, the orienting films 24 and 25 are oriented in such directions as to form an antiparallel structure. Moreover, the orienting films 24 and 25 is made of a horizontal alignment polyimide material so that the liquid crystal molecules are so oriented as to be substantially parallel to the substrates 21 and 22. With this, the liquid crystal molecules are uniaxially oriented so as to have a long axis direction substantially parallel to the polarization transmission axes.

In this case, as shown in FIG. 3(b), which is a cross-sectional view taken along the line A-A', when no voltage is applied, the liquid crystal molecules of the SW-LCD 12 are uniaxially oriented so as to be substantially parallel to the polarization transmission axis of the first polarization plate 13. Light incident on the SW-LCD 12 after having been emitted from the backlight 16 and having passed through the main LCD 14 passes through the first polarization plate 13. Therefore, the direction of polarization of the light incident on the SW-LCD 12 substantially corresponds to the direction of orientation a of the liquid crystal molecules.

FIG. 3(c) shows the way the liquid crystal molecules look when the SW-LCD 12 to which no voltage is applied is obliquely seen from the x direction. As shown in FIG. 3(c), a shape obtained by projecting each of the liquid crystal molecules as seen from the front direction (a shape of each of the liquid crystal molecules as seen from an observer 31) is similar to that of a liquid crystal molecule 35a, and the liquid crystal molecule 35a has a long axis direction substantially corresponding to the direction of polarization of the incident light. In cases where the angle between the long axis direction of the projection drawing of the liquid crystal molecule and the direction of polarization of the incident light is 0°, the incident light is transmitted without the influence of birefringence. Therefore, in this case, the image displayed by the main LCD 14 can be seen as it is. Similarly, a shape obtained by projecting each of the liquid crystal molecules as obliquely seen from the x direction is similar to those of liquid crystals 35b and 35c, and each of the liquid crystal molecules 35b and 35c has a long axis direction substantially corresponding to the direction of polarization of the incident light. Therefore, the image displayed by the main LCD 14 can be seen. That is, the image displayed by the main LCD 14 can be seen from any direction.

On the other hand, in cases where the viewing angle is controlled so that the image is prevented from being seen from an oblique direction, an AC voltage (e.g., a voltage of 100 Hz and 3 V) is applied to the transparent electrode films 25 and 26, to which no voltage is applied, in order that the liquid crystal molecules are rotated on the axis of the x direction so as to be tilted at 45° to the substrates 21 and 22. FIGS. 4(a) and 4(b) show the way the liquid crystal molecules look on this occasion. FIG. 4(a) is a cross-sectional view taken along the line A-A', and shows that the liquid crystal molecules are tilted at 45° to the substrates 21 and 22. FIG. 4(b) is a cross-sectional view taken along the line B-B', and shows that the liquid crystal molecules are tilted at approximately 45° with respect to the normal of the page.

Figure 4:
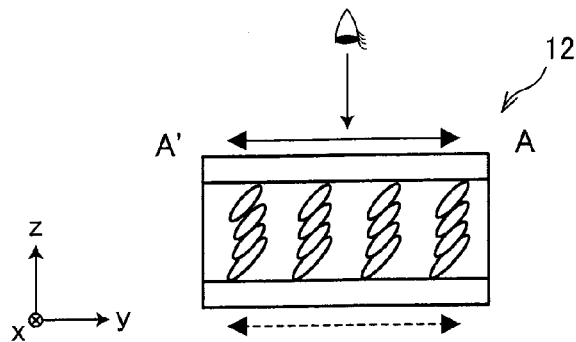
FIGS. 4(a) and 4(b) show the display section of the portable phone, according to the embodiment of the present invention, set in a mode in which viewing from an oblique direction is prevented.
Figure 4:
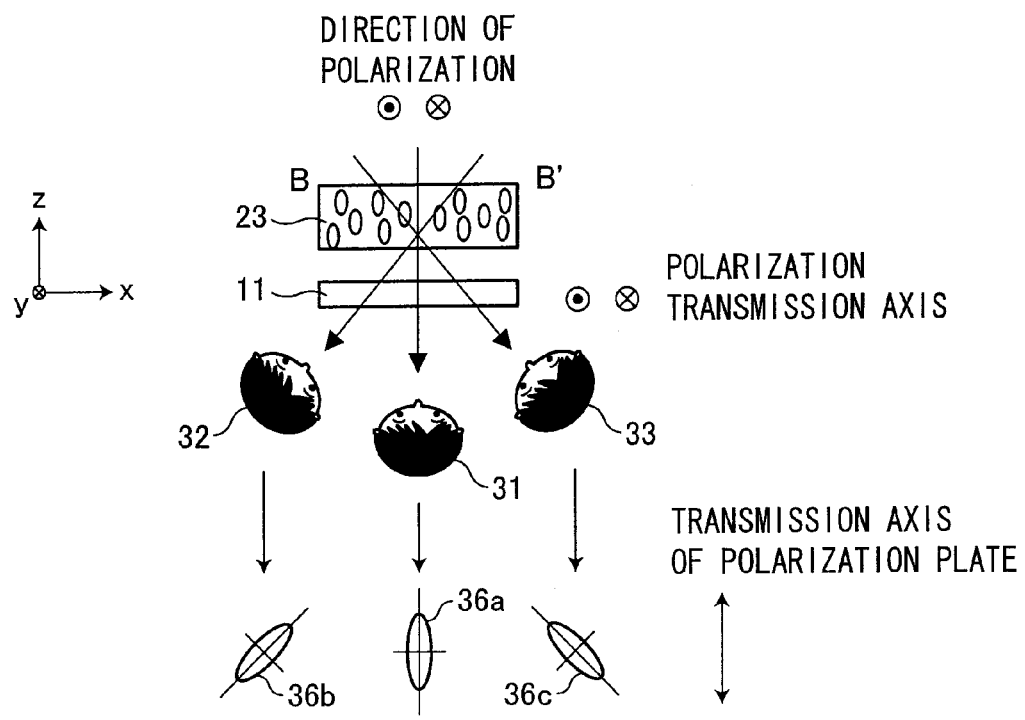

In this case, as shown in FIG. 4(b), a liquid crystal molecule 36a is a projection drawing obtained by projecting each of the liquid crystal molecules as seen from the observer 31, i.e., by projecting each of the liquid crystal molecules as seen from the front direction. The orientation of the liquid crystal molecules is changed by rotating the liquid crystal molecules on the axis of the x direction. Therefore, the respective polarization directions of the second polarization plate 11 and the first polarization plate 13 always corresponds to the long axis direction of the liquid crystal molecule 36a. For this reason, in cases where the display section 4 is seen from the front direction (in cases where the display section 4 is seen from the observer 31 of FIG. 4), the image displayed by the main LCD 14 can be directly transmitted without the influence of birefringence.

On the other hand, a liquid crystal molecule 36b is a projection drawing obtained by projecting each of the liquid crystal molecules as seen from an observer 32 who is on the left as he/she faces the display section 4, i.e., by projecting each of the liquid crystal molecules as seen from the left side of the substrates 21 and 22. In this case, the respective polarization directions of the second polarization plate 11 and the first polarization plate 13 are at an angle with the long axis direction of the liquid crystal molecule 36b, so that the long axis direction of the liquid crystal molecule 36b is at an angle of intersection with the direction of polarization of the incident light. Therefore, when the display section 4 is seen from the observer 32, the light does not passes through the SW-LCD 12 under the influence of birefringence of liquid crystals, so that the image displayed by the main LCD 12 cannot be transmitted.

Similarly, a liquid crystal molecule 36c is a projection drawing obtained by projecting each of the liquid crystal molecules as seen from an observer 33 who is on the right as he/she faces the display section 4, i.e., by projecting each of the liquid crystal molecules as seen from the right side of the substrates 21 and 22. The respective polarization directions of the second polarization plate 11 and the first polarization plate 13 are at an angle with the long axis direction of the projection drawing, so that the long axis direction of the projection drawing of the liquid crystal molecule is at an angle of intersection with the direction of polarization of the incident light. With this, the direction polarization is rotated. Therefore, when the display section 4 is seen from the observer 33, the light does not passes through the SW-LCD 14 under the influence of birefringence of liquid crystals, so that the image displayed by the main LCD 12 cannot be transmitted.

Because of such a mechanism, the following effects are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. In cases where the display section 4 is seen from a direction other than the front direction (in cases where the display section 4 is seen from the observers 32 and 33), the light does not passes through the SW-LCD under the influence of birefringence, so that the image displayed by the main LCD 14 becomes invisible.

Note that, at the time of voltage application for carrying out viewing angle control as described above, the liquid crystal molecules are not necessarily oriented in such a direction as to be tilted at 45° to the substrates 21 and 22, and that the liquid crystal molecules may be tilted at any degree as long as they are tilted with respect to the substrates 21 and 22. That is, the liquid crystal molecules only need to be tilted at an angle (i) larger than a tilt angle obtained when the liquid crystal molecules are substantially parallel to the substrates 21 and 22 and (ii) smaller than a tilt angle obtained when the liquid crystal molecules are substantially perpendicular to the substrates 21 and 22. (Specifically, the liquid crystal molecules only need to be tilted at an angle larger than 0° and smaller than 90°.) The liquid crystal molecules are preferably tilted at an angle of not less than 10° and not more than 80°, more preferably not less than 40° and not more than 50°. The reason for this is as follows: As the tilt angle approximates to 45°, the birefringence becomes larger, so that the image can be satisfactorily hidden. Further, when the tilt angle is small, a driving voltage becomes smaller, so that power consumption can be reduced.

In cases where an observer displaces himself/herself in the y direction, the long axis direction of the projection drawing of the liquid crystal molecule is not changed, so that it depends only on the displacement of the observer's eye in the x direction whether or not the main LCD 12 can be seen. Therefore, the line of sight from the front direction is the line of sight from a direction parallel to a y-z plane (i.e., a plane drawn by a point on a liquid crystal molecule as its direction of orientation is rotated to be changed).

Example 2 of the Orientation of the Liquid Crystal Molecules of the SW-LCD

Figure 5:
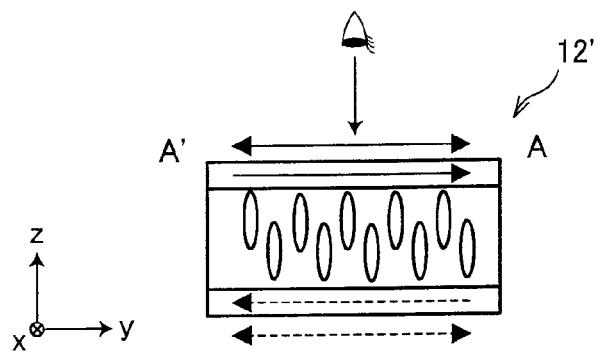
FIGS. 5(a) and 5(b) show a display section of a portable phone, according to another embodiment of the present invention, set in a single image display mode.
Figure 5:
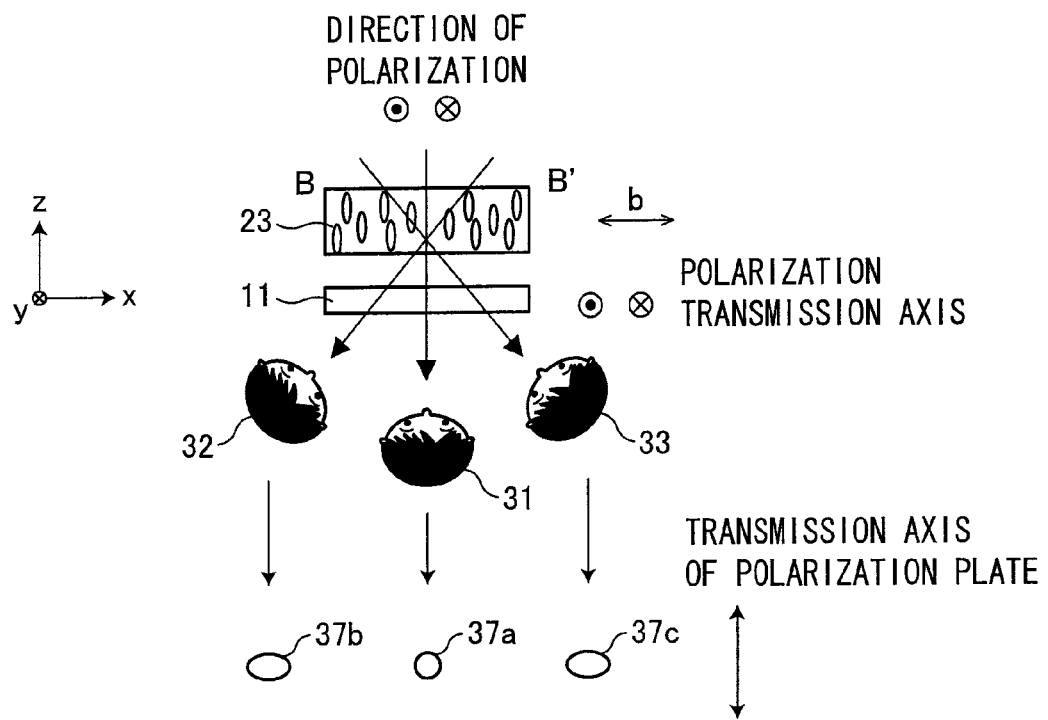
Figure 6:
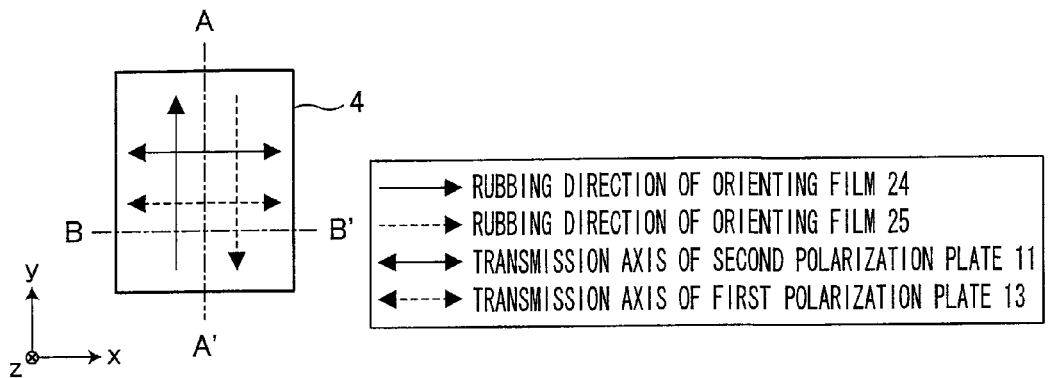
FIGS. 6(a) to 6(c) show the display section of the portable phone, according to the embodiment of the present invention, set in a mode, differing from the mode shown in FIG. 3, in which viewing from an oblique direction is not prevented.
Figure 6:
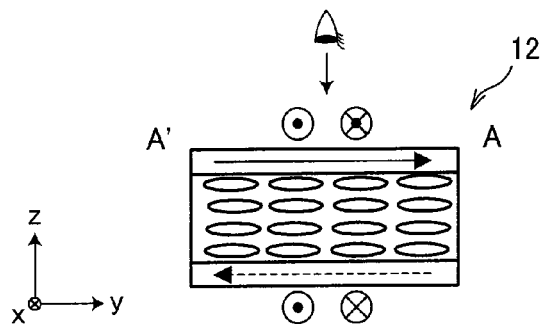
Figure 6:
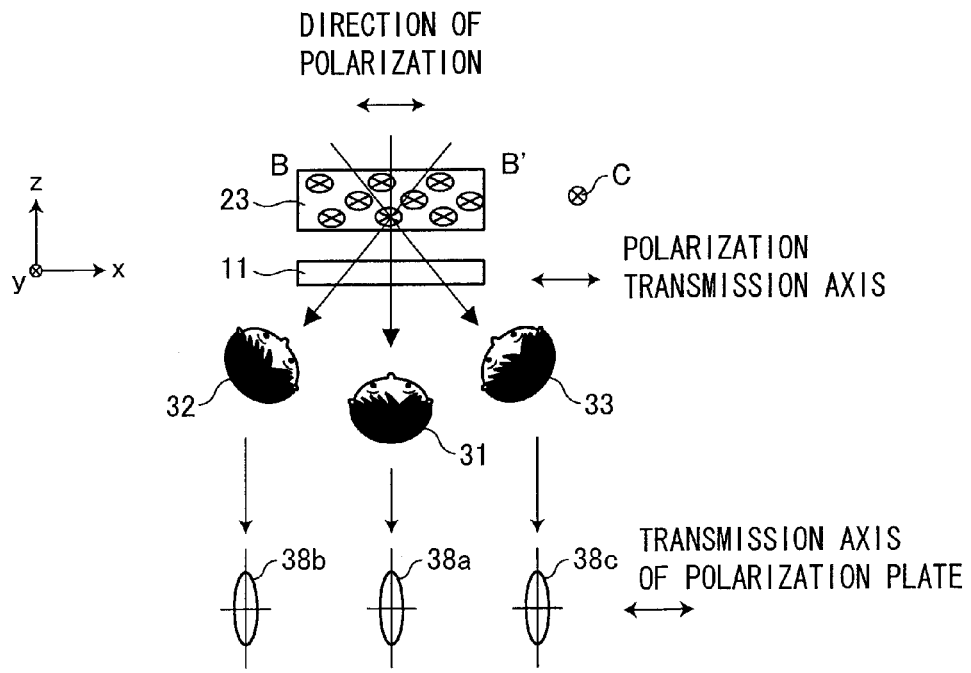

Example 2 of the orientation of the liquid crystal molecules of the SW-LCD will be described with reference to FIG. 5. Example 2 of the orientation of the liquid crystal molecules is realized by using a SW-LCD 12' obtained by replacing the orienting films 24 and 25 of the SW-LCD 12 with orienting films made of a vertical alignment polyimide material. With this, as shown in FIG. 5(a), the liquid crystal molecules can be oriented so as to be substantially perpendicular to the electrode substrates 21 and 22.

In this case, when no voltage is applied, the liquid crystal molecules of the SW-LCD 12' are uniaxially oriented so as to be substantially perpendicular to the substrates 21 and 22. That is, when seen from the front direction, a liquid crystal molecule 37 looks like a perfect circle (When the projection drawing looks like a perfect circle, it is assumed that any direction is a long axis direction). Moreover, when seen from a direction other than the front direction, each of the liquid crystal molecules has a long axis direction extending in the x direction, as with liquid crystal molecules 37b and 37c. Therefore, regardless of whether the liquid crystal molecule is projected from the front direction or another direction, the angle between the long axis direction b and the direction of polarization of the incident light becomes 90°. In cases where the angle between the long axis direction of the projection drawing of the liquid crystal molecule and the direction of polarization of the incident light is 90° (right angle), the incident light is transmitted without the influence of birefringence, so that the image displayed by the main LCD 14 can be directly seen regardless of the angle at which the image is observed.

On the other hand, in cases where the viewing angle is controlled so that the image is prevented from being seen from an oblique direction, an AC voltage is applied to the transparent electrode films 26 and 27, to which no voltage is applied, in order that the liquid crystal molecules are rotated on the axis of the x direction so as to be tilted at 45° to the substrates 21 and 22. In this case, the liquid crystal molecules look in the same manner as in Example 1, shown in FIG. 4, of the orientation of the liquid crystal molecules of the SW-LCD.

Because of the same mechanism, the following effects are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. However, in cases where the display section 4 is seen from a direction other than the front direction (in cases where the display section 4 is seen by the observers 32 and 33), the SW-LCD does not transmits light under the influence of birefringence, so that the image displayed by the main LCD 14 becomes invisible.

Example 3 of the Orientation of the Liquid Crystal Molecules of the SW-LCD

FIG. 6(a) shows the display section 4 of the portable phone 1 so that the upper and lower sides of the display screen respectively correspond to the upper and lower sides of the page.

First, as shown in FIG. 6(a), the second polarization plate 11 and the first polarization plate 13 are provided so as to have respective polarization transmission axes extending in the x direction. Further, the respective rubbing directions of the orienting films 24 and 25 are set to be perpendicular (y direction) to the respective polarization transmission axes of the first and second polarization plates 13 and 11 so as to be reversed 180° with respect to each other. That is, the orienting films 24 and 25 are oriented in such directions as to form an antiparallel structure. Moreover, the orienting films 24 and 25 are made of a horizontal alignment polyimide material so that the liquid crystal molecules are so oriented as to be substantially parallel to the substrates 21 and 22. With this, as shown in FIG. 6(b), the liquid crystal molecules are uniaxially oriented so as to have a long axis direction substantially perpendicular to the respective polarization transmission axes of the polarization plates.

In this case, as shown in FIG. 6(b), when no voltage is applied, the liquid crystal molecules of the SW-LCD 12 are uniaxially oriented so as to be parallel to the substrates 21 and 22 and so as to be at right angle with the polarization transmission axis of the first polarization plate 13. Light incident on the SW-LCD 12 after having been emitted from the backlight 16 and having passed through the main LCD 14 passes through the first polarization plate 13. Therefore, the direction of polarization of the light incident on the SW-LCD 12 is at right angle with the direction of orientation of the liquid crystal molecules. FIG. 6(c) shows the way the liquid crystal molecules look when the SW-LCD 12 to which no voltage is applied is obliquely seen from the x direction. As shown in FIG. 6(c), a shape obtained by projecting each of the liquid crystal molecules as seen from the front direction (a shape of each of the liquid crystal molecules as seen from the observer 31) is similar to that of a liquid crystal molecule 38a, and the liquid crystal molecule thus projected has a long axis direction c at right angle with the direction of polarization of the incident light. In cases where the angle between the long axis direction of the projection drawing of the liquid crystal molecule and the direction of polarization of the incident light is 90°, the incident light is transmitted without the influence of birefringence. Therefore, the image displayed by the main LCD 14 can be directly seen regardless of the angle at which the image is observed.

Figure 7:
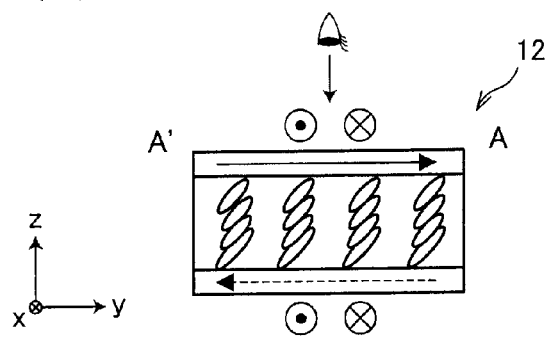
FIGS. 7(a) and 7(b) show the display section of the portable phone, according to the embodiment of the present invention, set in a mode, differing from the mode shown in FIG. 4, in which viewing from an oblique direction is prevented.
Figure 7:
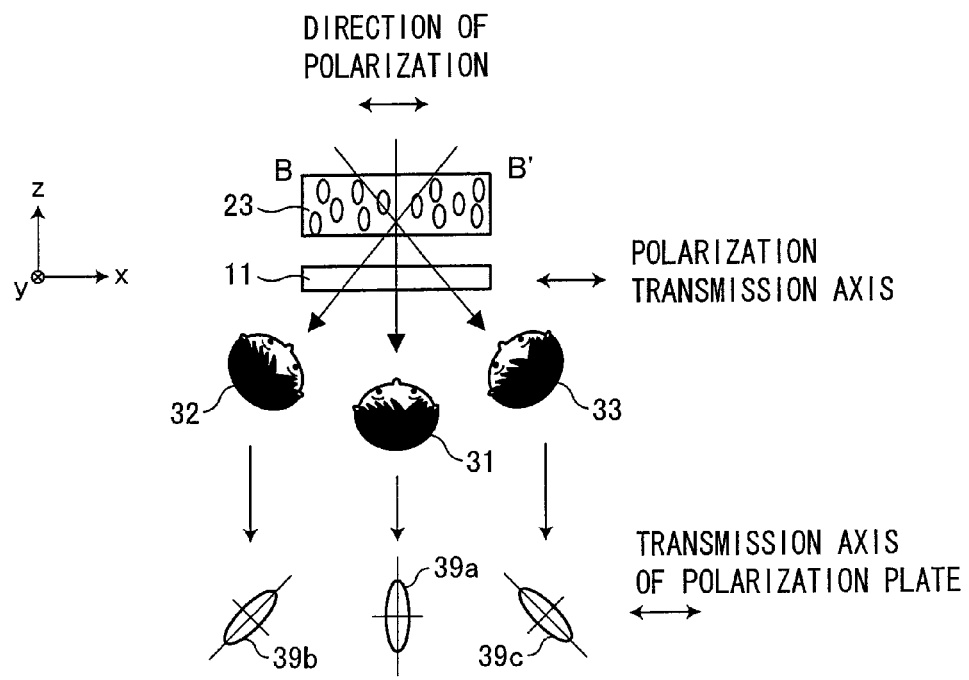

On the other hand, in cases where the viewing angle is controlled so that the image is prevented from being seen from an oblique direction, an AC voltage is applied to the transparent electrode films 25 and 26, to which no voltage is applied, in order that the liquid crystal molecules are rotated on the axis of the x direction so as to be tilted at 45° to the substrates 21 and 22. FIG. 7 shows the way the liquid crystal molecules look on this occasion. FIG. 7(a) is a cross-sectional view taken along the line A-A', and shows that the liquid crystal molecules are tilted at 45° to the substrates 21 and 22. FIG. 7(b) is a cross-sectional view taken along the line B-B', and shows that the liquid crystal molecules are tilted at 45° with respect to the normal of the page.

In this case, as shown in FIG. 7(b), a liquid crystal molecule 39a is a projection drawing obtained by projecting each of the liquid crystal molecules as seen from the observer 31, i.e., by projecting each of the liquid crystal molecules as seen from the front direction. The orientation of the liquid crystal molecules is changed by rotating the liquid crystal molecules on the axis of the x direction. Therefore, the respective polarization directions of the second polarization plate 11 and the first polarization plate 13 are at right angle with the long axis direction of the liquid crystal molecule 39a. Accordingly, the long axis direction of the projection drawing of the liquid crystal molecule becomes substantially perpendicular to the direction of polarization of the incident light. For this reason, in cases where the display section 4 is seen from the front direction (in cases where the display section 4 is seen from the observer 31), the image displayed by the main LCD 14 can be directly transmitted without the influence of birefringence.

On the other hand, a liquid crystal molecule 39b is a projection drawing obtained by projecting each of the liquid crystal molecules as seen from the observer 32 who is on the left as he/she faces the display section 4, i.e., by projecting each of the liquid crystal molecules as seen from the left side of the substrates 21 and 22. The respective polarization directions of the second polarization plate 11 and the first polarization plate 13 are at an angle with the long axis direction of the projection drawing, so that the long axis direction of the projection drawing of the liquid crystal molecule is at an angle of intersection with the direction of polarization of the incident light. Therefore, when the display section 4 is seen from the observer 32, the light does not passes through the SW-LCD 12 under the influence of birefringence of liquid crystals, so that the image displayed by the main LCD 12 cannot be transmitted.

Similarly, a liquid crystal molecule 39c is a projection drawing obtained by projecting each of the liquid crystal molecules as seen from an observer 33 who is on the right as he/she faces the display section 4, i.e., by projecting each of the liquid crystal molecules as seen from the right side of the substrates 21 and 22. The respective polarization directions of the second polarization plate 11 and the first polarization 40 plate 13 are at an angle with the long axis direction of the projection drawing, so that the long axis direction of the projection drawing of the liquid crystal molecule in at an angle of intersection with the direction of polarization of the incident light. Therefore, when the display section 4 is seen from the observer 33, the light does not passes through the SW-LCD 12 under the influence of birefringence of liquid crystals, so that the image displayed by the main LCD 12 cannot be transmitted.

Because of such a mechanism, the following effects are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. In cases where the display section 4 is seen from a direction other than the front direction (in cases where the display section 4 is seen from the observers 32 and 33), the light does not passes through the SW-LCD under the influence of birefringence, so that the image displayed by the main LCD 14 becomes invisible.

Example 4 of the Orientation of the Liquid Crystal Molecules of the SW-LCD

Figure 8:
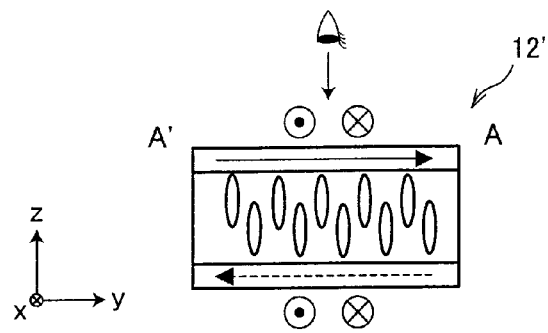
FIGS. 8(a) and 8(b) show a display section of a portable phone, according to another embodiment of the present invention, set in a single image display mode.
Figure 8:
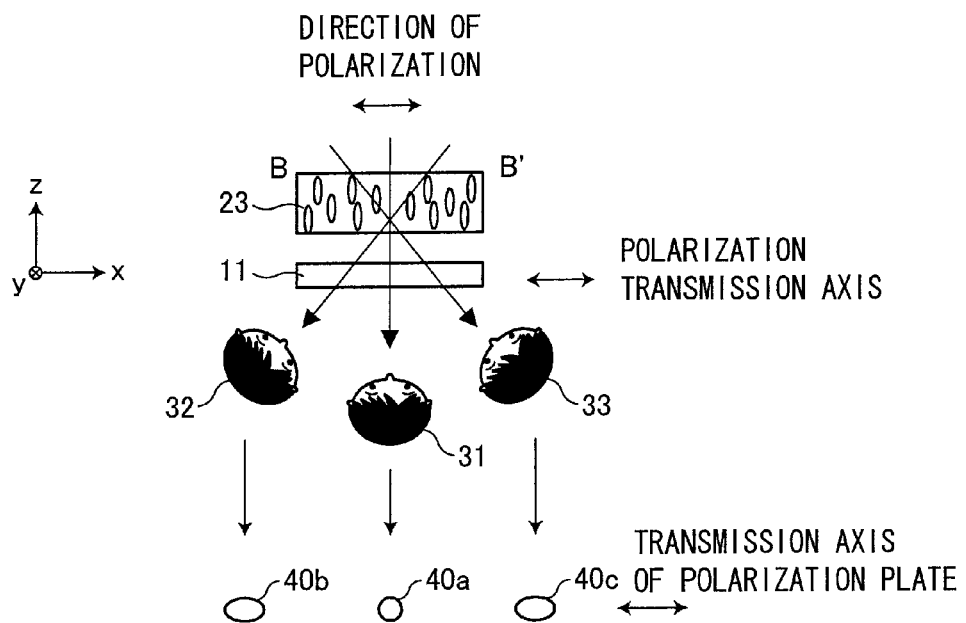

Example 4 of the orientation of the liquid crystal molecules of the SW-LCD will be described with reference to FIG. 8.

Example 4 of the orientation is realized by using a SW-LCD 12' obtained by replacing the orienting films 24 and 25 of the SW-LCD of Example 3 with orienting films made of a vertical alignment polyimide material. With this, the liquid crystal molecules can be oriented so as to be substantially perpendicular to the substrates 21 and 22.

In this case, when no voltage is applied, the liquid crystal molecules of the SW-LCD 12' are uniaxially oriented so as to be substantially perpendicular to the substrates 21 and 22. That is, as shown in FIG. 8(b), when seen from the front direction, a liquid crystal molecule 40a looks like a perfect circle. Moreover, when seen from a direction other than the front direction, each of the liquid crystal molecule seems to have a long axis direction extending in the x direction, as with liquid crystal molecules 40b and 40c. Therefore, regardless of whether the liquid crystal molecule is projected from the front direction or another direction, the long axis direction and the direction of polarization of the incident light correspond to each other. In cases where the angle between the long axis direction of the projection drawing of the liquid crystal molecule and the direction of polarization of the incident light is 0° (parallel), the incident light is transmitted without the influence of birefringence, so that the image displayed by the main LCD 14 can be directly seen regardless of the angle at which the image is observed.

On the other hand, in cases where the viewing angle is controlled so that image is prevented from being seen from an oblique direction, an AC voltage is applied to the transparent electrode films 26 and 27, to which no voltage is applied, in order that the liquid crystal molecules are rotated on the axis of the x direction so as to be tilted at 45° to the substrates 21 and 22. In this case, the liquid crystal molecules look in the same manner as in Example 1, shown in FIG. 9, of the orientation of the liquid crystal molecules of the SW-LCD.

Because of the same mechanism, the following effects are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. However, in cases where the display section 4 is seen from a direction other than the front direction (in cases where the display section 4 is seen by the observers 32 and 33), the SW-LCD does not transmit light under the influence of birefringence, so that the image displayed by the main LCD 14 becomes invisible.

Transmittance Measurement Experiment

The SW-LCDs of Examples 1 and 3 of the orientation of the liquid crystal molecules were used to measure how the transmittance is changed in accordance with the viewing angle at the time of viewing angle control (at the time of voltage application). The results are shown in FIGS. 9 and 10.

Figure 9:
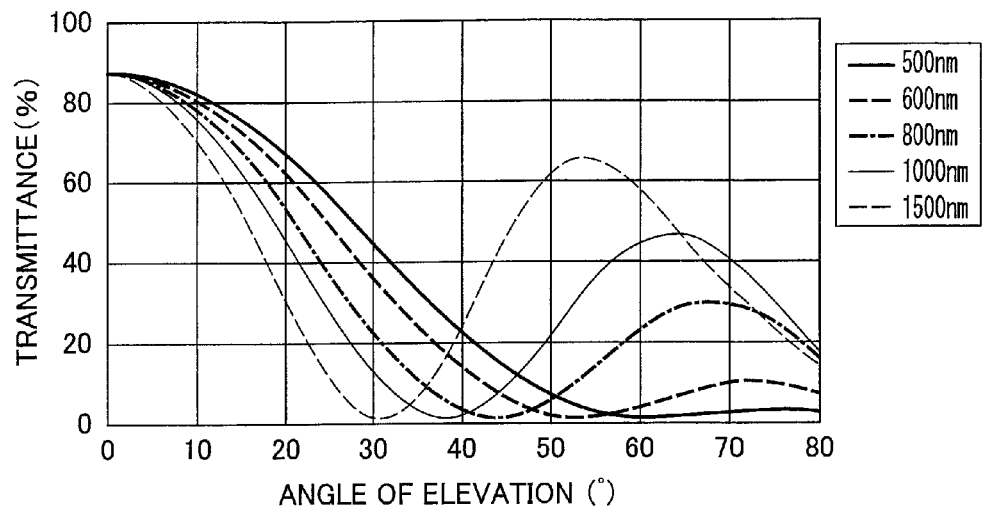
FIG. 9 is a diagram showing a relationship between the angle of elevation of the line of sight and the transmittance in a SW-LCD according to an embodiment of the present invention.
Figure 10:
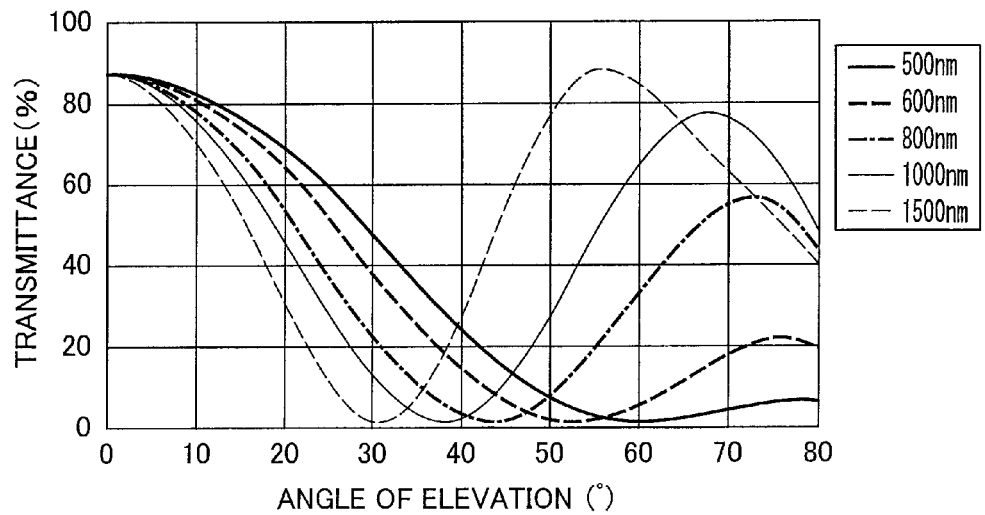
FIG. 10 is a diagram showing a relationship between the angle of elevation of the line of sight and the transmittance in a SW-LCD according to an embodiment of the present invention.

FIG. 9 is a graph showing a result of measurement performed when viewing angle control is carried out in (when a voltage is applied to) the SW-LCD of Example 1 of the orientation of the liquid crystal molecules is set in the multiple image display mode. The measurement was performed in the following manner. That is, the first polarization plate was provided so as to have a polarization transmission axis extending in an up-and-down direction, and the point of view was displaced in a right-and-left direction without changing a target point to be seen through the line of sight (the angle of elevation of 0°) extending in a direction (the direction of a normal) perpendicular to the display section 4. The point of view was displaced until the angle between the direction perpendicular to the display section 4 and the line of sight becomes 80° (i.e., until the angle of elevation changes from 0° to 80°). Then, the angle of elevation of the line of sight and the transmittance of the SW-LCD as seen through the line of sight were measured. In the graph, the horizontal axis represents the angle of elevation, and the vertical axis represents the transmittance. Further, the measurement was performed using SW-LCDs respectively having retardations of 500 nm, 600 nm, 800 nm, 1000 nm, and 1500 nm when seen from the front direction.

According to this, each of the SW-LCDs exhibited a maximum transmittance of approximately 85% with an angle of elevation of 0°, and exhibited a lower transmittance as the angle of elevation was increased. The SW-LCD having a retardation of 1500 nm exhibited a transmittance of approximately 0% with an angle of elevation of approximately 30°, and exhibited a higher transmittance again when the angle of elevation was further increased. The SW-LCD having a retardation of 1000 nm exhibited a transmittance of approximately 0% with an angle of elevation of approximately 38°, and the SW-LCD having a retardation of 800 nm exhibited a transmittance of approximately 0% with an angle of elevation of approximately 44°. Further, the SW-LCD having a retardation of 600 nm exhibited a minimum transmittance with an angle of elevation of approximately 50°, and only exhibited a transmittance of not more than 10% even when the angle of elevation was further increased. Similarly, the SW-LCD having a retardation of 500 nm exhibited a minimum transmittance with an angle of elevation of approximately 60°, and only exhibited a transmittance of not more than 10% even when the angle of elevation was further increased.

The retardation of a SW-LCD is determined in accordance with the extent to which the transmittance needs to be reduced. The extent of necessary reduction in transmittance is determined in accordance with the direction from which a main LCD is not allowed to be seen or in consideration of the use environment, the luminance of the main LCD, and the like. For example, in cases where the image displayed by the main LCD needs to be hidden with respect to the line of sight having an angle of elevation of approximately 45°, a SW-LCD having a retardation of 500 nm to 1000 nm may be used because it exhibits a low transmittance at this angle of elevation. In cases where the image displayed by the main LCD needs to be hidden mainly with respect to the line of sight having an angle of elevation of 30° to 50°, a SW-LCD having a retardation of 800 nm to 1000 nm may be used because it exhibits a low transmittance in this range of angle of elevation. On the other hand, in cases where the image displayed by the main LCD needs to be hidden with respect to the line of sight having an angle of elevation of larger than 40°, a SW-LCD having a retardation of 500 nm to 600 nm may be used because it exhibits a low transmittance in this range of angle of elevation.

Further, FIG. 10 is a graph showing a result of measurement performed when viewing angle control is carried out in (when a voltage is applied to) the SW-LCD of Example 3 of the orientation of the liquid crystal molecules is similarly set in the multiple image display mode. As compared with FIG. 9, the transmittance is even higher when the angle of elevation is large. Therefore, as with Example 1 of the orientation of the liquid crystal molecules, it is preferable that the liquid crystal molecules have a long axis direction substantially parallel to the polarization transmission axes. Note that: the features of the curves are similar to those of the curves of FIG. 9, so that an optimum retardation may be chosen in the same manner.

A display device according to the present invention has as an object to make it possible to prevent an image from being seen obliquely from right and left directions and from upper and lower directions. The following explains a specific arrangement for attaining this object. The terms "right and left directions" and "upper and lower directions" used herein refer to "right and left directions" and "upper and lower directions" obtained when the display section 4, for example, of the portable phone 1 shown in FIG. 2 is vertically positioned.

Figure 11:
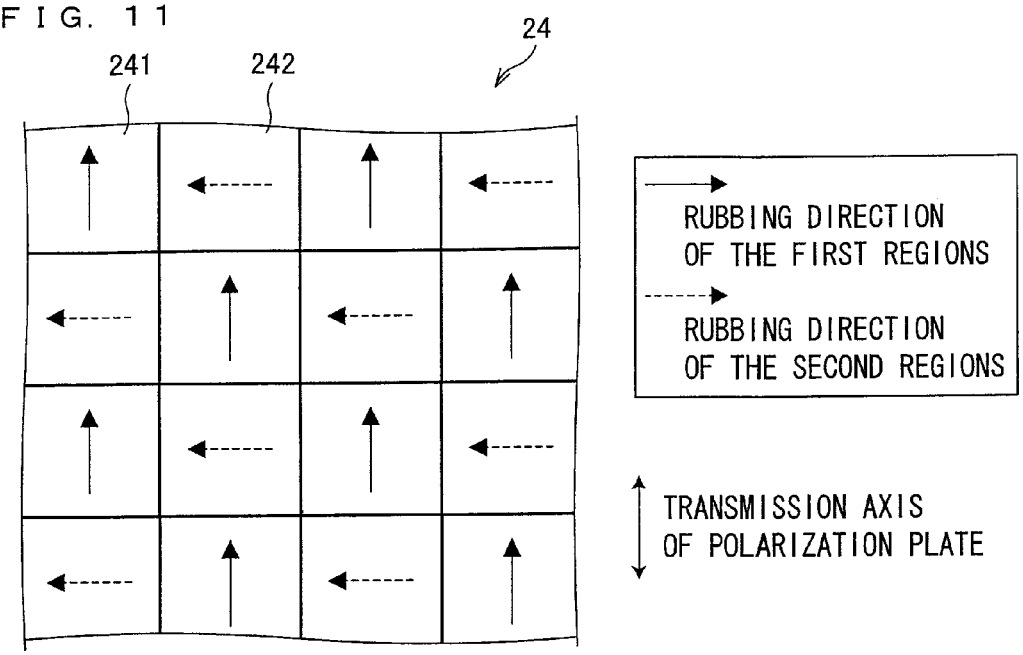
FIG. 11 is a plan view showing the division of an orienting film of a SW-LCD according to an embodiment of the present invention into regions.

In the display device according to the present embodiment, each of the orienting films 24 and 25 of the SW-LCD 12 shown in FIG. 1 is divided into two types of regions having different directions of orientation. Specifically, as shown in FIG. 11, the orienting film 24 is divided into first regions 241 and second regions 242 so as to have a checkerboard pattern of the first and second regions 241 and 242. Similarly, the orienting film 25 is divided into first regions and second regions so as to have a checkerboard pattern of the first and second regions. In the orienting films 24 and 25, the first and second regions face one another. The formation of a pattern for separating an orienting film into regions is not particularly limited. The pattern may be a checkerboard pattern as described above, or may be a stripe pattern or other patterns. However, an image formed by the pattern is a pattern image that is so superimposed on the main image in the narrow viewing angle display mode as to obscure the main image. Therefore, it is preferable that the pattern image have a fine pattern to some extent. Further, it is preferable that the first and second regions are distributed in a fifty-fifty proportion.

Furthermore, one of the first and second regions 241 and 242 of the orienting film 24 is set to be parallel to the polarization transmission axes of the first and second polarization plates 13 and 11, and the other one of the first and second regions 241 and 242 of the orienting film 24 is set to be orthogonal to the polarization transmission axes of the first and second polarization plates 13 and 11. In the orienting film 25, the first and second regions are revered 180° with respect to the first and second regions of the orienting film 24, respectively. That is, the orienting films 24 and 25 are oriented in such directions as to form an antiparallel structure. In the example shown in FIG. 11, in which it is assumed that the polarization transmission axes of the first and second polarization plates 13 and 11 extend in the y direction, the rubbing direction of the first regions of the orienting films 24 and 25 are set to be parallel to the polarization transmission axes of the first and second polarization plates 13 and 11, and the rubbing direction of the second regions of the orienting films 24 and 25 are set to be orthogonal to the polarization transmission axes of the first and second polarization plates 13 and 11.

The first and second regions of the orienting films 24 and 25 may be caused to have different rubbing directions, for example, by the following technique. First, an orienting film yet to be subjected to rubbing is entirely subjected to first rubbing so as to be rubbed in a rubbing direction corresponding to that of the first regions. Thereafter, only the first regions are masked by a resist, and the orienting film thus masked is subjected to second rubbing so as to be rubbed in a rubbing direction corresponding to that of the second regions. On this occasion, the first regions thus masked maintain the rubbing direction obtained by the first rubbing, but the second regions which are not masked have a rubbing direction obtained by the second rubbing. For this reason, by removing the mask from the orienting film after the second rubbing, an orienting film is obtained whose first and second regions have different rubbing directions.

Further, a method for obtaining an orienting film whose first and second regions have different rubbing directions is not limited to the aforementioned technique. For example, such an orienting film can be also obtained by using photo-alignment.

Figure 12:
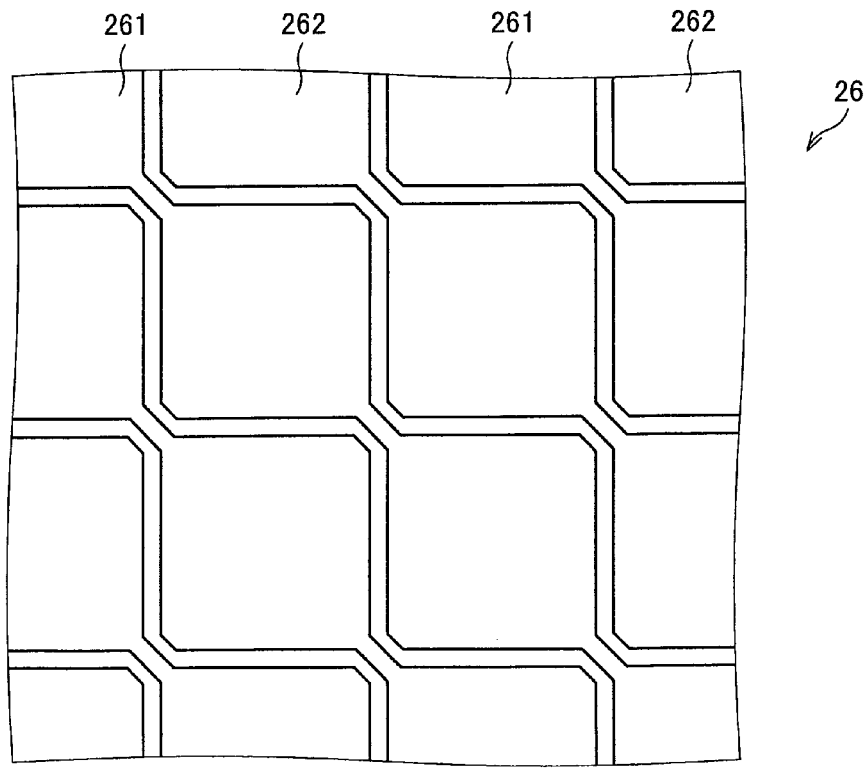
FIG. 12 is a plan view showing the division of a transparent electrode film of a SW-LCD according to an embodiment of the present invention into regions.

Further, in the SW-LCD 12, at least one of the transparent electrode films 26 and 27 respectively combined with the orienting films 24 and 25 is formed so as to have a substantially checkerboard-like pattern in accordance with the division of the orienting films 24 and 25 into the regions. FIG. 12 shows the transparent electrode film 26 as an example. In FIG. 12, the transparent electrode film 26 is patterned so as to be divided into first regions 261 and second regions 262. Further, the first and second regions 261 and 262 are formed so as to have their edges connected to one another, so as to enable voltage application. Therefore, the transparent electrode film 26 has a checkerboard pattern such as that shown in FIG. 12. The transparent electrode film 27 may be similarly divided into first regions and second regions, or may be a common electrode that is to be formed in correspondence with the whole area of the display section 4.

The first regions of the transparent electrode film 26 thus patterned so as to be divided correspond to the first regions of the orienting films 24 and 25, and a voltage is applied to that portion of the liquid crystal layer 23 which corresponds to these regions. Similarly, the second regions of the transparent electrode films 26 and 27 correspond to the second regions of the orienting films 24 and 25, and a voltage is applied to that portion of the liquid crystal layer 23 that corresponds to these regions. With this, in the SW-LCD 12, the orientation of those liquid crystal molecules of the liquid crystal layer 23 which correspond to the first regions and the orientation of those liquid crystal molecules of the liquid crystal layer 23 which correspond to the second regions can be controlled independently of each other.

According to the liquid crystal display device of the aforementioned arrangement, when the display section 4 is vertically positioned, that portion of the liquid crystal molecules which corresponds to the first regions is in a state shown in Example 1 of the orientation of the liquid crystal molecules. On the other hand, when the display section 4 is horizontally positioned, that portion of the liquid crystal molecules which corresponds to the second regions is in a state shown in Example 3 of the orientation of the liquid crystal molecules.

For this reason, by using the transparent electrode film 261 to apply a voltage to that portion of the liquid crystal layer 23 which corresponds to the first regions, that portion of the image displayed by the main LCD 14 which corresponds to the first regions can be prevented from being seen obliquely from right and left directions. Specifically, a checkerboard pattern corresponding to the first regions is superimposed onto the image displayed by the main LCD 14, so that the main image is obscured.

Further, by using the transparent electrode film 262 to apply a voltage to that portion of the liquid crystal layer 23 which corresponds to the second regions, that portion of the image displayed by the main LCD 14 which corresponds to the second regions can be prevented from being seen obliquely from upper and lower directions (right and left directions in cases where the display section 4 is seen in its horizontal position). Specifically, a checkerboard pattern corresponding to the second regions is superimposed onto the image displayed by the main LCD 14, so that the main image is obscured.

According to the liquid crystal display device explained above, Examples 1 and 3 of the orientation of the liquid crystal molecules are used in the first and second regions, respectively. However, there may be a liquid crystal display device in which Examples 2 and 4 of the orientation of the liquid crystal molecules are used. That is, when no voltage is applied to the vertically orienting films used in Examples 2 and 4 of the orientation of the liquid crystal molecules, the vertically orienting films cause the liquid crystal molecules of the SW-LCD 12' to be so uniaxially oriented as to be substantially perpendicular to the substrates 21 and 22. However, the direction in which the liquid crystal molecules are tilted (rotated) when a voltage is applied is controlled by the rubbing direction of the vertically orienting films. For this reason, by causing the vertically orienting films to have first and second regions having different rubbing directions, the same effects are obtained as those obtained by the liquid crystal display device using Examples 1 and 3 of the orientation of the liquid crystal molecules.

As described above, in cases where no voltage is applied to those portions of the liquid crystal layer 23 which respectively corresponds to the first and second regions of the SW-LCD 12 of the display device according to the present embodiment, the main image can be seen obliquely from any one of the upper and lower directions and the right and left directions. This case is set as the wide viewing angle display mode. Further, in the narrow viewing angle display mode, in cases where a voltage is applied to that portion of the liquid crystal layer 23 which corresponds to the first regions and no voltage is applied to that portion of the liquid crystal layer 23 which corresponds to the second regions, the main image is prevented from being seen obliquely only from the right and left directions. In cases where no voltage is applied to that portion of the liquid crystal layer 23 which corresponds to the first regions and a voltage is applied to that portion of the liquid crystal layer 23 which corresponds to the second regions, the main image is prevented from being seen obliquely only from the upper and lower directions. In cases where a voltage is applied to both that portion of the liquid crystal layer 23 which corresponds to the first regions and that portion of the liquid crystal layer 23 which corresponds to the second regions, the main image can be prevented from being seen obliquely from the upper and lower directions and from the right and left directions.

Figure 13:
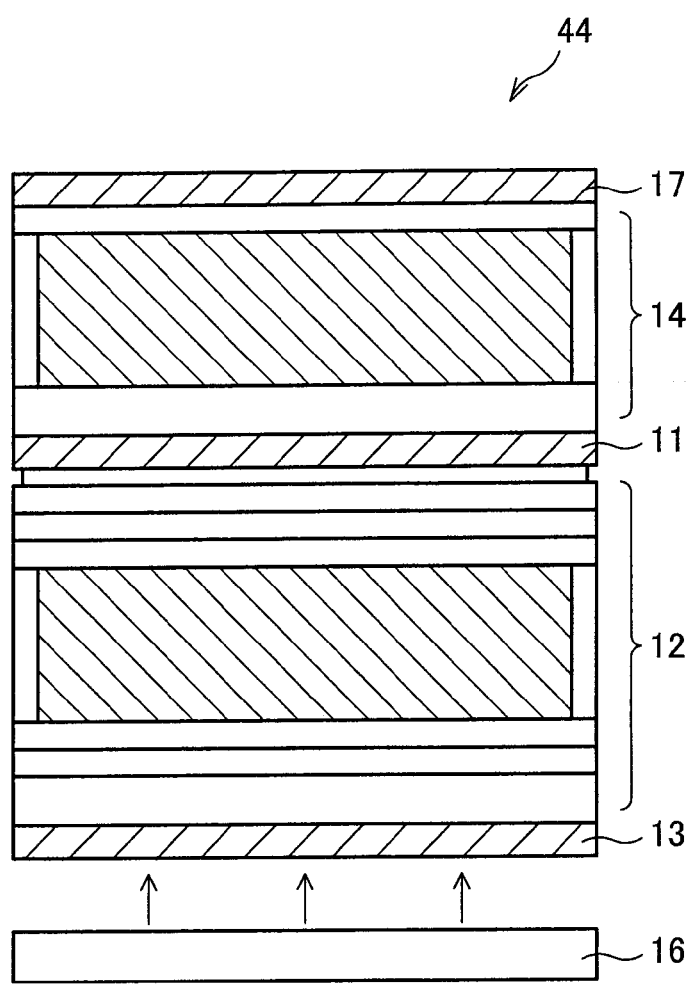
FIG. 13 is a cross-sectional view of a display section of a portable phone according to another embodiment of the present embodiment.

The above description explains an example in which the SW-LCD 12 is closer to the front (i.e., to the side of the display surface) than is the main LCD 14. However, see a display section 44, shown in FIG. 13, in which the SW-LCD 12 is provided on a back surface of the main LCD 14 (i.e., on the opposite side of the display surface). Even in this case, it is possible to control the way light is incident on the main LCD 14, so that it is possible to control a viewing angle. In the display section 44, polarization plates 11 and 17 are respectively provided on both surfaces of the main LCD 14, and a polarization plate 13 is provided on a surface of the SW-LCD 12 so as to be farther from the main LCD 14 than is the SW-LCD 12.

However, the image superimposed by the SW-LCD 12 is more sharply defined when the SW-LCD 12 is closer to the front than is the main LCD 14. Further, in cases where the main LCD 14 carries out a transmissive liquid crystal display in the multiple image display mode, the SW-LCD 12 may be in the front or back. However, in cases where a reflective liquid crystal display is carried out, the SW-LCD 12 needs to be provided so as to be closer to the front than is the main LCD 14.

On the other hand, see the case where the SW-LCD 12 is closer to the back than is the main LCD 14. In this case, when the main LCD 14 carries out a reflective liquid crystal display, the SW-LCD 12 does not attenuate light. Therefore, in case of a transflective liquid crystal display device or in cases where a reflective liquid crystal display is carried out in the single image display mode, it is preferable that the SW-LCD 12 be provided so as to be closer to the back than is the main LCD 14.

Further, according to the SW-LCD 12 shown in the above example, the transparent electrode films as well as the orienting films are divided into the regions, so that the control of a viewing angle in the upper and lower directions and the control of a viewing angle in the right and left directions can be carried out independently of each other. However, in the display device of the present invention, the transparent electrode films of the SW-LCD do not necessarily need to be divided into regions. That is, in an arrangement in which the transparent electrode films are not divided into regions but are used as common electrodes, the control of a viewing angle in the upper and lower directions and the control of a viewing angle in the right and left directions are carried out simultaneously.

Figure 14:
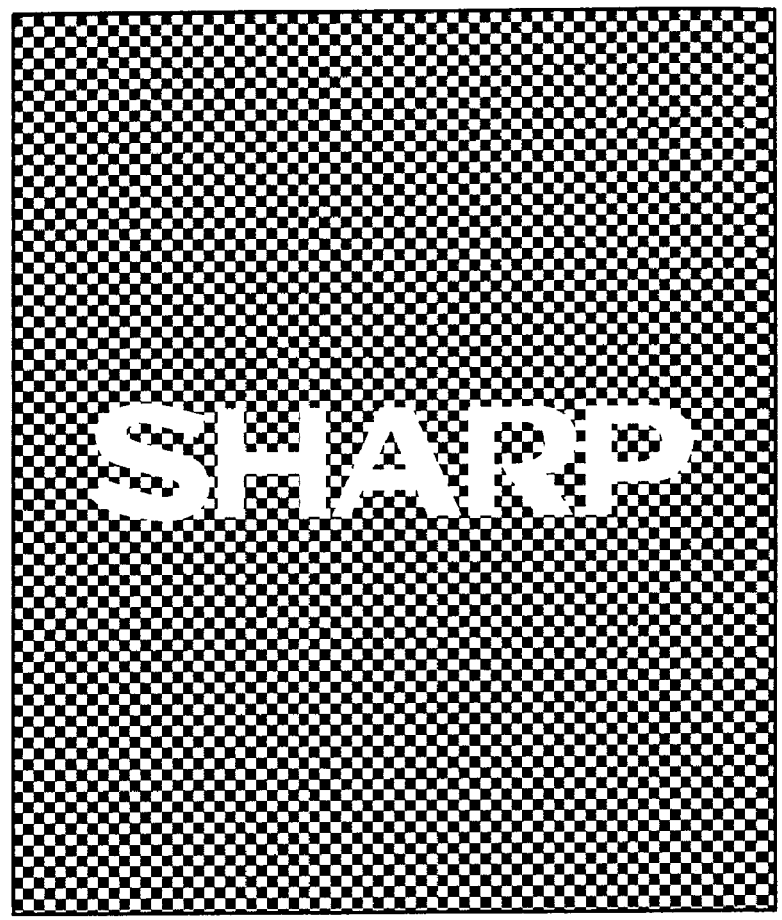
FIG. 14 is a plan view showing an image displayed by the display section of the portable phone according to the embodiment of the present invention when the display section is seen from an oblique direction in a narrow viewing angle display mode.

Further, one of the transparent electrode films 26 and 27 subjected to patterning so as to have a pattern such as that shown in FIG. 12, and the other one of the transparent electrode films 26 and 27 is subjected to electrode patterning so that an electrode is provided in a region other than that region of the transparent electrode film which corresponds to a specific logo pattern or the like. With this, at least one of the transparent electrode films includes a logo portion, and no voltage is applied to that portion of the liquid crystal layer which corresponds to the logo portion, the portion of the liquid crystal layer is oriented in the same direction as when no voltage is applied, i.e., in a direction substantially parallel to the substrates 21 and 22. Therefore, regardless of the direction from which the logo portion is seen, the logo portion is free from the influence of birefringence in the SW-LCD 14. Thus, in the narrow viewing angle display mode, the observer sees a logo image, such as that shown by the display section in FIG. 14, in which the pattern image is seen in a portion other than the logo portion and in which the logo portion transmits light.

Figure 15:
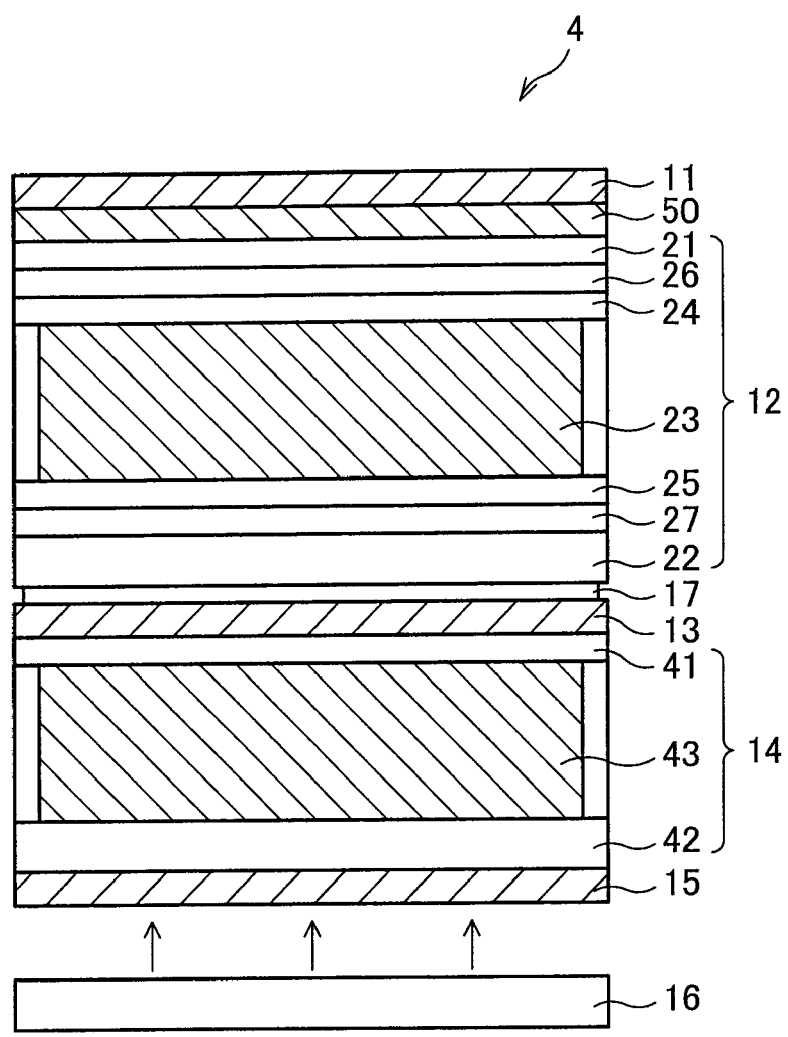
FIG. 15 is a cross-sectional view of a display section of a portable phone according to an embodiment of the present invention.

Further, according to the display device of the present embodiment, the respective polarization transmission axes of the first and second polarization plates 13 and 11 are identical to each other in terms of their directions. However, as shown in FIG. 15, even in cases where the polarization transmission axes are at an angle with each other, the same functions can be obtained by disposing, between the second polarization plate 11 and the substrate 21, a polarization rotation member 50 for rotating the direction of polarization of incident light. That is, the polarization rotation member 50 rotates the direction of polarization of linear polarized light emitted from a liquid crystal molecule, thereby producing linear polarized light such as that extracted by the second polarization plate 11. With this, even when the respective polarization transmission axes of the first and second polarization plates 13 and 11 do not correspond to each other, it is possible to cause the second polarization plate 11 to extract the linear polarized light emitted from the liquid crystal molecule. Examples of the polarization rotation member 50 include a ½λ plate (wave plate).

Note that: as long as the polarization rotation member 50 is provided between the first and second polarization plates 13 and 11, the polarization rotation member 50 may be provided so as to be closer to a light-receiving side than is the liquid crystal layer, or the polarization rotation member 50 may be provided so as to be closer to a light-emitting side than is the liquid crystal layer. Further, the polarization rotation member 50 may be provided so as to be closer to the light-receiving side than is the first polarization plate 13.

Further, the present embodiment explains a case where the present invention is applied to a liquid crystal display section of a portable phone. However, the present invention is not limited to this, and can be applied to a portable electronic apparatus, such as a mobile personal computer, audio-video equipment, or a DVD player, which has a display device. Alternatively, the present invention may be applied to a non-portable display device so as to be used as a display capable of carrying out different displays in accordance with different viewing directions.

As described above, a display device according to the present invention is a display device, including: image display means for displaying an image; and display switching means for electrically switching between (i) an image to be seen in a single image display mode and (ii) an image to be seen in a multiple image display mode, in the single image display mode, the display switching means allowing an image displayed by the image display means to be seen from any direction, in the multiple image display mode, the display switching means (a) allowing an image displayed by the image display means to be seen from a front direction and (b) allowing an image obtained by superimposing, on an image displayed by the image display means, a pattern image formed by the display switching means to be seen from an oblique direction, and the display switching means being divided into a first region and a second region, in the single image display mode, the display switching means allowing an image, displayed by the image display means, to be seen from any direction in both of the first and second regions, in the multiple image display mode, the display switching means either (I) allowing an image to be seen from right and left directions, which image is obtained by superimposing, on an image displayed by the image display means, an pattern image causing the first region to be a non-transmission region, or (II) allowing an image to be seen from upper and lower directions, which image is obtained by superimposing, on an image displayed by the image display means, a pattern image causing the second region to be a non-transmission region.

According to the foregoing arrangement, a pattern image formed by the display switching means is superimposed on an image displayed by the image display means, so that the image displayed by the mage display means is prevented from being seen from an oblique direction.

Furthermore, the display switching means is divided into (i) a first region that prevents an image from being seen obliquely from right and left directions and (ii) a second region that prevents an image from being seen obliquely from upper and lower directions. This makes it possible to realize a display device which makes it possible to prevent an image from being seen obliquely from the right and left directions and from the upper and lower directions.

Further, the display device can be arranged such that: the display switching means is a liquid crystal layer provided between a pair of substrates, and further includes (i) first polarizing means for causing linear polarized light having a fixed polarization direction to be incident on the display switching means and (ii) second polarizing means for extracting linear polarized light having a fixed polarization direction from light emitted from the display switching means; the liquid crystal layer has liquid crystal molecules whose orientation directions are divided so that a long axis direction and a polarization direction of linear polarized light incident on the liquid crystal molecules are substantially parallel to each other in one of the first and second regions, and are substantially perpendicular to each other in the other one of the first and second regions, the long axis direction corresponding to a direction which the liquid crystal molecules have when projected from a direction orthogonal to the substrates; the second polarizing means extracts linear polarized light emitted from the liquid crystal molecules; in the single image display mode, the liquid crystal molecules are oriented so that the long axis extends substantially parallel or substantially perpendicular to the substrates, in both of the first and second regions; and in the multiple image display mode, the liquid crystal molecules are oriented so that the long axis is tilted with respect to the substrates, in at least one of the first and second regions.

According to the foregoing arrangement, the long axis direction of the liquid crystal molecules of the liquid crystal layer is included in a surface defined by a transmission axis or an absorption axis of the first polarizing means and a light traveling direction, and the liquid crystal molecules can be (i) in a state of being substantially perpendicular or substantially parallel to the light traveling direction or (ii) in a state of being tilted with respect to the light traveling direction. The statement "the liquid crystal molecules are tilted" as used herein means that the long axis direction of the liquid crystal molecules is neither parallel nor perpendicular to a direction or a plane.

In other words, in the single image display mode, the long axis direction of a liquid crystal molecule of the liquid crystal layer is substantially parallel to the substrates, and is substantially parallel or substantially perpendicular to the polarization transmission axis of the first polarizing means. In the multiple image display mode, switched from the single image display mode, the long axis direction is tilted toward a direction perpendicular to the substrates. Alternatively, in the single image display mode, the long axis direction of a liquid crystal molecule of the liquid crystal layer is substantially perpendicular to the substrates. In the multiple image display mode, switched from the single image display mode, the long axis direction is tilted in a surface substantially parallel or substantially perpendicular to the polarization transmission axis of the first polarizing means and perpendicular to the substrates.

According to this, the first polarizing means causes light incident on the display switching means to be linear polarized light having a fixed polarization direction. Further, in the liquid crystal layer of the display switching means, the long axis direction of a liquid crystal molecule projected from a direction perpendicular to the substrates is oriented so as to be always substantially parallel or substantially perpendicular to the direction of polarization of light having passed through the first polarizing means.

In cases where the direction of polarization of light incident on the liquid crystal layer is parallel or perpendicular to the long axis direction of a liquid crystal molecule projected from a certain direction, no birefringence occurs when the liquid crystal layer is seen from that direction. Therefore, regardless of which of the modes is selected, no birefringence occurs when the liquid crystal layer is seen from a direction parallel to a plane drawn by a point on a liquid crystal molecule as its orientation is changed (such direction being hereinafter referred to as "front direction"). Therefore, for example, the image displayed by the image display device can be seen by using the second polarizing means to extract linear polarized light having a direction identical to that of linear polarized light emitted by the first polarizing means. The extraction can be carried out (i) by setting the respective polarization transmission axes of the first and second polarizing means in the same direction, or (ii) by providing a member which (i) rotates the direction of polarization so that linear polarized light emitted from the first polarizing means corresponds to the transmission axis of the second polarizing means, and then (ii) causes the linear polarized light to be incident on the second polarizing means.

An image to be seen in the signal image display mode and an image to be seen in the multiple image display mode are different from each other when the images are seen from a direction other than the front direction (such direction being hereinafter referred to as "oblique direction").

In the single image display mode, the long axis direction of a liquid crystal molecule is substantially parallel or substantially perpendicular to the substrates in both the first regions and the second regions, so that the long axis direction of a liquid crystal molecule projected from an oblique direction is identical to that of a liquid crystal molecule projected from the front direction. Therefore, no birefringence occurs in a liquid crystal molecule when the liquid crystal molecule is seen from an oblique direction, so that incident light can pass through the liquid crystal layer and the second polarization means. This makes it possible to see the image displayed by the image display means.

On the other hand, in the multiple image display mode, the long axis direction of a liquid crystal molecule is tilted with respect to the substrates, so that the long axis direction of a liquid crystal molecule projected from an oblique direction is at an angle of intersection with the direction of polarization of incident light. Therefore, birefringence occurs in a liquid crystal molecule when the liquid crystal molecule is seen from an oblique direction. This causes a change in the direction of polarization of light having passed through the liquid crystal layer, so that it becomes impossible to cause the light to pass through the second polarizing means. This makes it impossible to see the image displayed by the image display means.

Therefore, the image displayed by the image display means can be seen from any direction in the single image display mode, and can only be seen from a specific direction in the multiple image display mode. This allows the display device to change the viewing angle in accordance with a situation such as a situation where a confidential document needs to be browsed in a public place or a situation where a shot image needs to be viewed by a large number of people.

Further, according to such an arrangement, the viewing angle is controlled by controlling birefringence. Therefore, the display quality of the image display means can be satisfactorily retained with a simple arrangement.

Further, the display device is preferably arranged such that: a viewing angle is controlled with respect to the first and second regions, independently, in the multiple image display mode, by patterning transparent electrode films in the first and second regions, separately, via which electrode films a voltage is applied to the liquid crystal layer.

According to the foregoing arrangement, control of preventing an image from being seen obliquely from right and left directions and control of preventing an image from being seen obliquely from upper and lower directions can be carried out independently of each other depending on the way a display device is used.

An electronic apparatus of the present invention includes such a display device.

This makes it possible to realize an electronic apparatus which has a simple arrangement, which retains display quality, and which makes it possible to switch to such a mode that a display image is hidden when seen from a specific direction.

A display device of the present invention can be set to a mode in which different images are seen depending on viewing directions, and therefore can be applied, for example, to (i) a display of a portable electronic apparatus such as a portable communication terminal, a mobile personal computer, audio-video equipment, or a DVD player, and to (ii) a display in which plural types of information can be shown depending on viewing directions.

The invention claimed is:

1. A display device, comprising:
an image display device arranged to display an image; and
a display switching device arranged to electrically switch between (i) an image to be seen in a single image display mode and (ii) an image to be seen in a multiple image display mode, wherein
in the single image display mode, the display switching device allows an image displayed by the image display device to be seen from any direction,
in the multiple image display mode, the display switching device (a) allows an image displayed by the image display device to be seen from a front direction and (b) allows an image obtained by superimposing, on an image displayed by the image display device, a pattern image formed by the display switching device to be seen from an oblique direction, and
the display switching device being divided into a first region and a second region, in the single image display mode, the display switching device allows an image, displayed by the image display device, to be seen from any direction in both of the first and second regions,
in the multiple image display mode, the display switching device being arranged to independently control (I) allowing an image to be seen from right and left directions, which image is obtained by superimposing, on an image displayed by the image display device, a pattern image causing the first region to be a non-transmission region, and (II) allowing an image to be seen from upper and lower directions, which image is obtained by superimposing, on an image displayed by the image display device, a pattern image causing the second region to be a non-transmission region.

2. The display device as set forth in claim 1, wherein:
the display switching device includes a liquid crystal layer provided between a pair of substrates, and further includes (i) a first polarizing device arranged to cause linear polarized light having a fixed polarization direction to be incident on the display switching device and (ii) a second polarizing device arranged to extract linear polarized light having a fixed polarization direction from light emitted from the display switching device;
the liquid crystal layer includes liquid crystal molecules whose orientation directions are divided so that a long axis direction and a polarization direction of linear polarized light incident on the liquid crystal molecules are substantially parallel to each other in one of the first and second regions, and are substantially perpendicular to each other in the other one of the first and second regions, the long axis direction corresponding to a direction which the liquid crystal molecules have when projected from a direction orthogonal to the substrates;
the second polarizing device extracts linear polarized light emitted from the liquid crystal molecules;
in the single image display mode, the liquid crystal molecules are oriented so that the long axis extends substantially parallel or substantially perpendicular to the substrates, in both of the first and second regions; and
in the multiple image display mode, the liquid crystal molecules are oriented so that the long axis is tilted with respect to the substrates, in at least one of the first and second regions.

3. The display device as set forth in claim 2, wherein a viewing angle is controlled with respect to the first and second regions, independently, in the multiple image display mode, by patterning transparent electrode films in the first and second regions, separately, via which electrode films a voltage is applied to the liquid crystal layer.

4. An electronic apparatus, comprising a display apparatus as set forth in claim 1.

* * * * *